United States Patent
Stenneth

(10) Patent No.: US 9,734,721 B2
(45) Date of Patent: Aug. 15, 2017

(54) ACCIDENT NOTIFICATIONS

(71) Applicant: HERE Global B.V., LB Veldhoven (NL)

(72) Inventor: Leon Oliver Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/827,008

(22) Filed: Aug. 14, 2015

(65) Prior Publication Data
US 2017/0046216 A1    Feb. 16, 2017

(51) Int. Cl.
| | | |
|---|---|---|
| G08G 1/00 | (2006.01) | |
| G01P 15/00 | (2006.01) | |
| G08B 25/00 | (2006.01) | |
| G06F 11/07 | (2006.01) | |
| B60W 30/08 | (2012.01) | |

(52) U.S. Cl.
CPC .............. *G08G 1/207* (2013.01); *G01P 15/00* (2013.01); *G06F 11/0793* (2013.01); *G08B 25/006* (2013.01); *G08B 25/007* (2013.01); *B60W 2030/082* (2013.01)

(58) Field of Classification Search
CPC .......... B60W 2030/082; G08B 25/006; G08B 25/007; G08G 1/207; G01P 15/00
See application file for complete search history.

(56) References Cited

U.S. PATENT DOCUMENTS

| | | | | |
|---|---|---|---|---|
| 6,211,777 | B1 * | 4/2001 | Greenwood | G08G 1/162 180/272 |
| 6,591,176 | B1 * | 7/2003 | Perry | B60R 21/013 701/45 |

(Continued)

FOREIGN PATENT DOCUMENTS

| | | |
|---|---|---|
| BR | PI1104571 | 8/2013 |
| WO | WO2011123324 | 10/2011 |
| WO | WO2015009887 | 1/2015 |

OTHER PUBLICATIONS

Goud et al., Vehicle Accident Automatic Detection and Remote Alarm Device, Jul. 2012, core.ac.uk.

(Continued)

*Primary Examiner* — Dale W Hilgendorf
(74) *Attorney, Agent, or Firm* — Lempia Summerfield Katz LLC

(57) ABSTRACT

A method comprising receiving sensor information from at least one sensor, determining that a vehicle was involved in an accident based, at least in part, on the sensor information, determining that an informative notification criteria is satisfied based, at least in part, on the accident, sending an informative notification in response to the determination that the informative notification criteria is satisfied, determining whether a remedial request criteria is satisfied based, at least in part, on the accident and the sensor information, in circumstances where the remedial request criteria is satisfied, sending a remedial request based, at least in part, on the satisfaction of the remedial request criteria, and in circumstances where the remedial request criteria fails to be satisfied, precluding sending of the remedial request based, at least in part, on the failure of satisfaction of the remedial request criteria is disclosed.

21 Claims, 8 Drawing Sheets

FIG. 6

(56) References Cited

U.S. PATENT DOCUMENTS

| | | | | |
|---|---|---|---|---|
| 6,819,929 B2* | 11/2004 | Antonucci | ............ | H04M 11/04 |
| | | | | 455/404.1 |
| 7,158,016 B2* | 1/2007 | Cuddihy | ............. | G08B 25/016 |
| | | | | 701/45 |
| 7,991,552 B2* | 8/2011 | Samuel | ................. | G08G 1/166 |
| | | | | 701/301 |
| 8,155,865 B2* | 4/2012 | Bicego, Jr. | ....... | G08G 1/096827 |
| | | | | 701/117 |
| 8,972,100 B2 | 3/2015 | Mullen et al. | | |
| 2010/0102970 A1* | 4/2010 | Hertz | .................... | A42B 3/046 |
| | | | | 340/573.1 |
| 2013/0267194 A1* | 10/2013 | Breed | ................. | G06K 9/2018 |
| | | | | 455/404.2 |
| 2014/0288781 A1* | 9/2014 | Horiguchi | .............. | G08B 25/10 |
| | | | | 701/45 |

OTHER PUBLICATIONS

Mane et al., Vehicle Collision Recognition and Monitoring System Based on AVR Platform, Oct.-Nov. 2014, vol. 2, Issue 6, International Journal of Engineering Research and Science.

Toyota Unveils a Driverless Prototype with Culpability-Evasion Feature that can "Hit & Run", Apr. 5, 2015, Telematics Wire.

Whitwam, How Google's Self Driving Cars Detect and Avoid Obstacles, Sep. 8, 204, extremetech.com.

* cited by examiner

ACCIDENT NOTIFICATIONS

TECHNICAL FIELD

The present application relates generally to sending information from a vehicle involved in an accident.

BACKGROUND

Autonomous vehicles are increasingly being utilized to transport goods, survey geographical features and roads, and/or the like. In some circumstances, autonomous vehicles may interact with other vehicles, people, and/or the like. As such, it may be desirable to allow an autonomous vehicle to interact with other vehicles, people, apparatuses, and/or the like in a safe and efficient manner.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for receiving sensor information from at least one sensor, determining that a vehicle was involved in an accident based, at least in part, on the sensor information, determining that an informative notification criteria is satisfied based, at least in part, on the accident, sending an informative notification in response to the determination that the informative notification criteria is satisfied, determining whether a remedial request criteria is satisfied based, at least in part, on the accident and the sensor information, in circumstances where the remedial request criteria is satisfied, sending a remedial request based, at least in part, on the satisfaction of the remedial request criteria, and in circumstances where the remedial request criteria fails to be satisfied, precluding sending of the remedial request based, at least in part, on the failure of satisfaction of the remedial request criteria.

One or more example embodiments may provide an apparatus, a computer readable medium, a computer program product, and/or a non-transitory computer readable medium having means for receiving sensor information from at least one sensor, means for determining that a vehicle was involved in an accident based, at least in part, on the sensor information, means for determining that an informative notification criteria is satisfied based, at least in part, on the accident, means for sending an informative notification in response to the determination that the informative notification criteria is satisfied, means for determining whether a remedial request criteria is satisfied based, at least in part, on the accident and the sensor information, in circumstances where the remedial request criteria is satisfied, means for sending a remedial request based, at least in part, on the satisfaction of the remedial request criteria, and in circumstances where the remedial request criteria fails to be satisfied, means for precluding sending of the remedial request based, at least in part, on the failure of satisfaction of the remedial request criteria.

One or more example embodiments further determine whether another remedial request criteria is satisfied based, at least in part, on the accident and the sensor information, in circumstances where the other remedial request criteria is satisfied, send another remedial request based, at least in part, on the satisfaction of the other remedial request criteria, and in circumstances where the other remedial request criteria fails to be satisfied, preclude sending of the other remedial request based, at least in part, on the failure of satisfaction of the other remedial request criteria.

One or more example embodiments further determine that another informative notification criteria is satisfied based, at least in part, on the accident, and send another informative notification in response to the determination that the other informative notification criteria is satisfied.

One or more example embodiments further determine that the vehicle fails to be occupied.

In at least one example embodiment, the determination that the informative notification criteria is satisfied is based, at least in part, on the determination that the vehicle fails to be occupied.

In at least one example embodiment, the sending of the informative notification is based, at least in part, on the determination that the vehicle fails to be occupied.

In at least one example embodiment, the determination of whether the remedial request criteria is satisfied is based, at least in part, on the determination that the vehicle fails to be occupied.

In at least one example embodiment, the sending of the remedial request is based, at least in part, on the determination that the vehicle fails to be occupied.

One or more example embodiments further receive additional sensor information from at least one sensor, wherein the determination that the vehicle fails to be occupied is based, at least in part, on the additional sensor information.

In at least one example embodiment, the additional sensor information is received from at least one occupancy sensor.

In at least one example embodiment, the sensor is comprised by the vehicle.

In at least one example embodiment, the sensor information is received from a separate vehicle.

One or more example embodiments further receive other sensor information from at least one sensor.

In at least one example embodiment, the satisfaction of the informative notification criteria is based, at least in part, on the other sensor information.

In at least one example embodiment, the satisfaction of the remedial request criteria is based, at least in part, on the other sensor information.

In at least one example embodiment, the remedial request criteria is an emergency assistance request criteria, and the remedial request is an emergency assistance request.

In at least one example embodiment, the emergency assistance request criteria is a police assistance criteria, and the emergency assistance request is a police assistance request.

In at least one example embodiment, the emergency assistance request criteria is a medical assistance criteria, and the emergency assistance request is a medical assistance request.

One or more example embodiments further determine a type of object involved in the accident, wherein the satisfaction of the medical assistance criteria is based, at least in part, on the type of object involved in the accident.

In at least one example embodiment, the determination of the type of object involved in the accident comprises receipt of other sensor information that represents the environment surround the vehicle at a time prior to the accident, and identification of the type of object involved in the accident based, at least in part, on the other sensor information.

In at least one example embodiment, the other sensor information is image information, and the identification of the type of object involved in the accident is based, at least in part, on the image information.

In at least one example embodiment, the emergency assistance request criteria is a fire assistance criteria, and the emergency assistance request is a fire assistance request.

In at least one example embodiment, the remedial request criteria is a site remedy assistance criteria, and the remedial request is a site remedy assistance request.

In at least one example embodiment, the site remedy assistance criteria is a tow assistance criteria, and the site remedy request is a tow assistance request.

In at least one example embodiment, the tow assistance criteria indicates a value associated with at least one of a tire pressure sensor, an oil sensor, a fuel sensor, a battery sensor, or an operational state of the vehicle.

In at least one example embodiment, the site remedy assistance criteria is a clean-up assistance criteria, and the site remedy request is a clean-up assistance request.

In at least one example embodiment, the clean-up assistance criteria indicates a value associated with at least one of a tire pressure sensor, an oil sensor, a fuel sensor, a battery sensor, a glass break sensor, or an operational state of the vehicle.

In at least one example embodiment, the site remedy assistance criteria is a roadside service assistance criteria, and the site remedy request is a roadside service assistance request.

In at least one example embodiment, the roadside service assistance criteria indicates a value associated with at least one of a tire pressure sensor, an oil sensor, a fuel sensor, a battery sensor, or an operational state of the vehicle.

One or more example embodiments further determine that a tow assistance request fails to have been sent, wherein the sending of the roadside service assistance request is based, at least in part, on the determination that the tow assistance request fails to have been sent.

In at least one example embodiment, the informative notification is an owner informative notification.

In at least one example embodiment, the informative notification is an insurance informative notification.

In at least one example embodiment, the informative notification is a property owner informative notification.

In at least one example embodiment, the informative notification is a service provider informative notification.

In at least one example embodiment, the informative notification fails to be a remedial request.

One or more example embodiments further determine a location of the vehicle, and determine that the vehicle is located at a dangerous location based, at least in part, on the location of the vehicle.

In at least one example embodiment, the determination that the vehicle is located at a dangerous location is further based, at least in part, on map information.

One or more example embodiments further determine a navigational path to another location that fails to be a dangerous location.

One or more example embodiments further cause the vehicle to move along the navigational path to the other location.

One or more example embodiments further receive map information, wherein the determination that the vehicle is location at a dangerous location is based, at least in part, on the location of the vehicle and the map information.

One or more example embodiments further identify another vehicle that is proximate to the vehicle.

One or more example embodiments further identify another vehicle that was involved in the accident.

One or more example embodiments further send at least a portion of the sensor information to the other vehicle based, at least in part, on the identification of the other vehicle.

One or more example embodiments further determine that the other vehicle is an emergency response vehicle, wherein the sending of the portion of the sensor information to the other vehicle is based, at least in part, on the determination that the other vehicle is the emergency response vehicle.

In at least one example embodiment, the portion of the sensor information comprises sensor information that was received prior to the accident.

In at least one example embodiment, the portion of the sensor information comprises sensor information that was received subsequent to the accident.

One or more example embodiments further send vehicle information to the other vehicle based, at least in part, on the identification of the other vehicle.

In at least one example embodiment, the vehicle information is vehicle insurance information.

In at least one example embodiment, the vehicle information is vehicle registration information.

In at least one example embodiment, the vehicle information is sensor information.

One or more example embodiments further determine that an emergency response vehicle has arrived, and send at least a portion of the sensor information to the emergency response vehicle based, at least in part, on the determination that the emergency response vehicle has arrived.

One or more example embodiments further determine that an emergency response vehicle has arrived, and send vehicle information to the emergency response vehicle based, at least in part, on the arrival of the emergency response vehicle.

BRIEF DESCRIPTION OF THE DRAWINGS

For a more complete understanding of one or more example embodiments, reference is now made to the following descriptions taken in connection with the accompanying drawings in which.

DETAILED DESCRIPTION OF THE DRAWINGS

Figure 1:
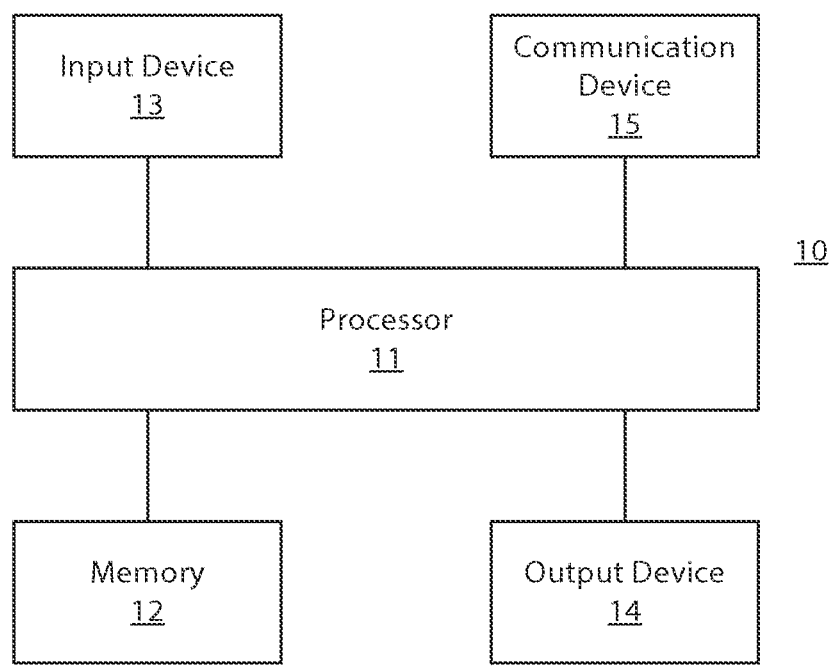
FIG. 1 is a block diagram showing an apparatus according to at least one example embodiment.

Various example embodiments and some of their potential advantages are understood by referring to FIGS. 1 through 8 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an infotainment system, an automobile, a watercraft, an aircraft, an agricultural implement, and autonomous vehicle, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as BLUETOOTH, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

Figure 2:
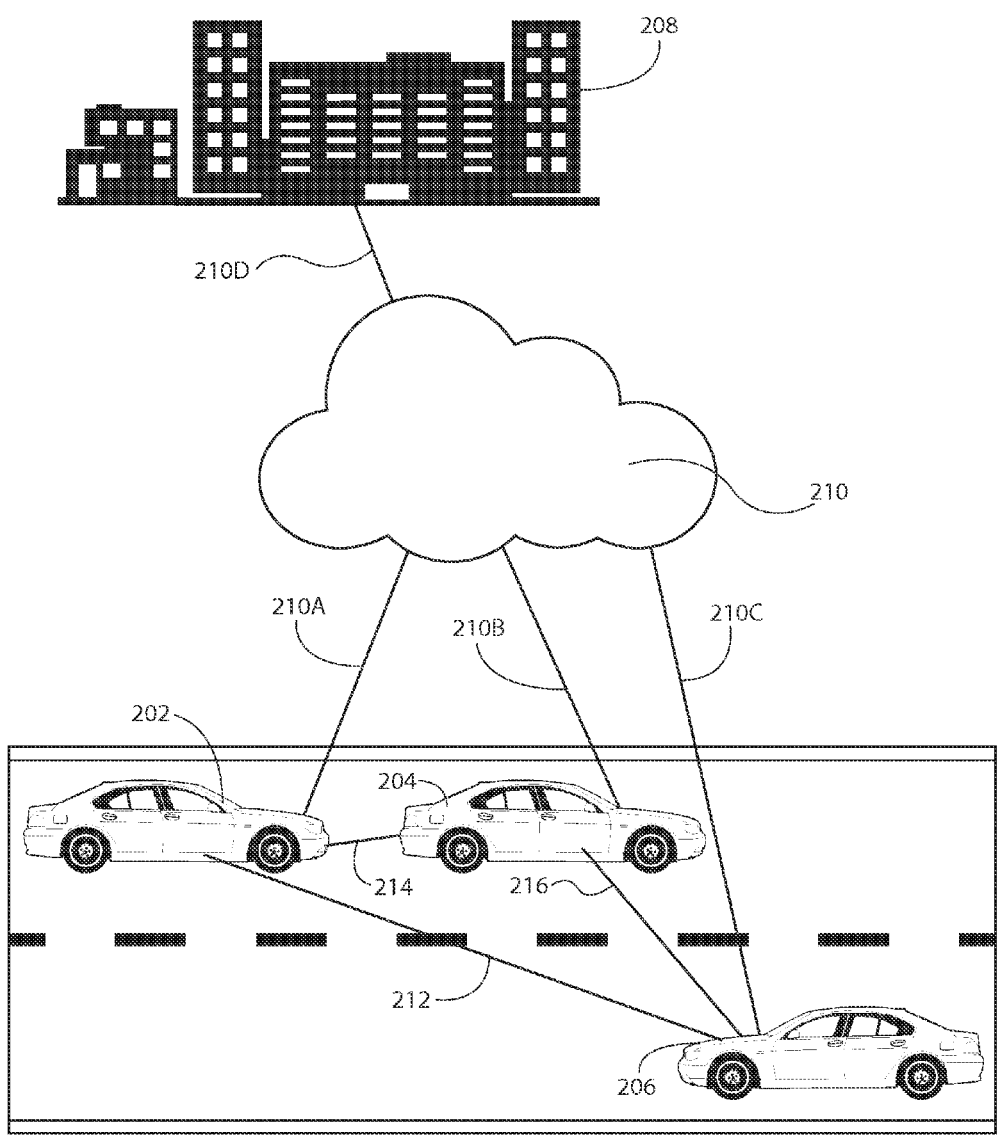
FIG. 2 is a diagram illustrating apparatus communication according to at least one example embodiment.

FIG. 2 is a diagram illustrating apparatus communication according to at least one example embodiment. The example of FIG. 2 is merely an example and does not limit the scope of the claims. For example, apparatus count may vary, apparatus configuration may vary, communication channels may vary, and/or the like.

In modern times, vehicles may utilize one or more sensors to navigate autonomously. For example, a vehicle, an automobile, an aircraft, a watercraft, an agricultural implement, and/or the like may utilize a satellite navigation system such as a Global Positioning System (GPS) receiver, a GLONASS receiver, a Galileo receiver, and/or the like to determine the vehicle's location on the Earth and navigate to a different location without real time control input from an operator of the vehicle. In at least one example embodiment, an apparatus determines a location of a vehicle. In some circumstances, a vehicle may utilize a radar sensor, a camera module, an ultrasonic sensor, and/or the like to sense and automatically avoid objects such as other vehicles, impassable objects, pedestrians, and/or the like. In at least one example embodiment, an apparatus receives sensor information from at least one sensor. Sensor information may refer to raw data, formatted data, processed data, and/or the like received from a sensor. For example, a GPS receiver may transmit data packets to an apparatus having a particular format, a radar sensor may transmit analog voltages to the apparatus, and/or the like.

A vehicle that may navigate in manners such as previously described and other similar manners without real time control input from an operator may be referred to as an autonomous vehicle. For example, an automobile that automatically navigates by way of a GPS receiver may be an autonomous vehicle. In at least one example embodiment, a vehicle is an autonomous vehicle. In some circumstances, an autonomous vehicle may receive non-real time control input to control the navigation of the vehicle. For example, an operator of the autonomous vehicle may communicate a navigational path for the apparatus to follow before a trip of the autonomous vehicle is initiated, and may update the navigational path while the autonomous vehicle is navigating. In other examples, the autonomous vehicle may receive real-time control inputs for at least a portion of the operation of the autonomous vehicle. For example, an autonomous delivery van may be controlled by a human for some maneuvers, and may operate autonomously during traveling from one destination to another.

One or more example embodiments may include a geographic database. For example, the geographic database may comprise, navigational data, location attributes, and/or the like. Information included within a geographic database may be referred to as map data. For example, the geographic database may include node data records, road segment or link data records, point of interest (POI) data records, perspective image data records, video content data records, and other data records. In at least one example embodiment, map data includes at least one of road segment data, POI data, node data, traffic information, or weather information. More, fewer or different data records may be provided. In at least one example embodiment, the other data records include cartographic ("carto") data records, routing data, and maneuver data. One or more portions, components, areas, layers, features, text, and/or symbols of the POI or event data may be stored in, linked to, and/or associated with one or more of these data records. For example, one or more portions of the POI, event data, or recorded route information may be matched with respective map or geographic records via position or GPS data associations (such as using known or future map matching or geo-coding techniques), for example.

In at least one example embodiment, the road segment data records are links or segments representing roads, streets, or paths, as may be used in the calculated route or recorded route information for determination of one or more personalized routes. The node data records may be end points corresponding to the respective links or segments of the road segment data records. The road link data records and the node data records may represent a road network, such as used by vehicles, cars, and/or other entities. Alternatively, the geographic database may contain path segment and node data records or other data that represent pedestrian paths or areas in addition to or instead of the vehicle road record data, for example.

The road/link segments and nodes, as well as other geographic locations may be associated with attributes, such as geographic coordinates, road surface conditions, traffic conditions, adjacent geographic features, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database may include data about the POIs and their respective locations in the POI data records. The geographic database may also include data about places, such as cities, towns, or other communities, and other geographic features, such as bodies of water, mountain ranges, etc. Such place or feature data may be part of the POI data or may be associated with POIs or POI data records (such as a data point used for displaying or representing a position of a city). In addition, the geographic database may include and/or be associated with event data (e.g., traffic incidents, constructions, scheduled events, unscheduled events, etc.) associated with the POI data records or other records of the geographic database.

The geographic database may be maintained by a content provider (e.g., a map developer) in association with a services platform. By way of example, the map developer may collect geographic data to generate and enhance the geographic database. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used.

The geographic database may be a master geographic database stored in a format that facilitates updating, maintenance, and development. For example, the master geographic database or data in the master geographic database may be in an ORACLE spatial format or other spatial format, such as for development or production purposes. The ORACLE spatial format or development/production database may be compiled into a delivery format, such as a geographic data files (GDF) format. The data in the production and/or delivery formats may be compiled or further compiled to form geographic database products or databases, which may be used in end user navigation apparatuses or systems.

Geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation apparatus, such as by an end user apparatus, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation apparatus developer or other end user apparatus developer, may perform compilation on a received geographic database in a delivery format to produce one or more compiled navigation databases.

In some circumstances, the geographic data compiled within a database may be static data. For example, the geographic data may be values that rarely or never change, such as the latitude and longitude of an address, the relative positions of roads, and/or the like. Such data may be referred to as static map data. In some circumstances, the geographic data compiled within a database may be dynamic data. For example, the geographic data may be values that change frequently over time, such as traffic conditions, weather conditions, and/or the like. Such data may be referred to as dynamic map data.

As mentioned above, a server side geographic database may be a master geographic database, but in alternate embodiments, a client side geographic database may represent a compiled navigation database that may be used in or with an end user apparatus to provide navigation and/or map-related functions. For example, the geographic database may be used with an end user apparatus to provide an end user with navigation features. In such an example, the geographic database may be downloaded or stored on the end user apparatus, such as in one or more applications, or the end user apparatus may access the geographic database through a wireless or wired connection (such as via a server and/or a communication network), for example.

In at least one example embodiment, the end user apparatus is one of an in-vehicle navigation system, a personal navigation device (PND)/personal navigation apparatus, a portable navigation device/portable navigation apparatus, a cellular telephone, a mobile phone, a personal digital assistant (PDA), a watch, a camera, a computer, and/or other apparatuses that may perform navigation-related functions, such as digital routing and map display. In at least one example embodiment, the navigation apparatus is a cellular telephone. An end user may use the end user apparatus for navigation and map functions such as guidance and map display, for example, and for determination of one or more personalized routes or route segments based, at least in part, on one or more calculated and recorded routes, according to exemplary embodiments. In at least one example embodiment, an apparatus receives map data that is associated with a location of an autonomous vehicle. Map data that is associated with the location of the autonomous vehicle may refer to map data that has a data association with the location of the autonomous vehicle. For example, a navigational apparatus mounted within the autonomous vehicle may receive GPS signals corresponding with latitude and longitude coordinates, and the navigational apparatus may receive map data associated with the coordinates from a geographical database. In some circumstances, map data may be stored in memory. For example, a navigational apparatus may comprise non-volatile memory, a hard disk drive, and/or the like to store a geographical database. In at least one example embodiment, map data comprises retrieving the map data from memory. In some circumstances, map data may be stored on a separate apparatus. For example, the map data may be stored on a server hosted by a service provider, stored in the memory of a separate apparatus such as an automobile, and/or the like. In at least one example embodiment, receiving the map data comprises retrieving the map data from a separate apparatus.

To facilitate autonomous operation of a vehicle, it may be desirable for an apparatus to communicate with another apparatus. For example, it may be desirable for an autonomous vehicle to receive map data from a service provider, for an autonomous vehicle to receive location information associated with other vehicles, and/or the like. In this manner, an autonomous vehicle may navigate in a safe and accurate manner, may avoid colliding with other objects and vehicles, and/or the like.

The example of FIG. 2 illustrates communication between apparatuses 202, 204, 206, and 208 by way of communication channels 210, 212, 214, and 216. Even though the example of FIG. 2 illustrates apparatuses 202, 204, and 206 as automobiles and apparatus 208 as a building, it should be understood that the communication in the example of FIG. 2 may be between apparatuses associated with apparatuses 202, 204, 206 and 208. For example, the communication may be between electronic apparatuses housed within any of apparatuses 202, 204, 206, and 208. An electronic apparatus may be an electronic apparatus that a user commonly utilizes during performance of various tasks, activities, and/or the like. For example, apparatus 202 may house an electronic apparatus that an operator of apparatus 202 frequently utilizes to view information, to browse websites, to search for map information, and/or the like. For example, the electronic apparatus may be a phone, a tablet, a computer, a laptop, a navigation system, and/or the like. In another example, apparatus 208 may house a separate electronic apparatus. The separate electronic apparatus may be utilized to store information associated with the electronic apparatus, to process information received from the electronic apparatus, and/or the like. For example, a separate electronic apparatus may be a phone, a tablet, a computer, a laptop, a server, a database, a cloud platform, and/or the like. Although the aforementioned example describes an electronic apparatus and a separate electronic apparatus in some circumstances, the apparatuses may both be electronic apparatuses, both be separate electronic apparatuses, and/or the like.

In the example of FIG. 2, apparatus 202 communicates with apparatus 204 by way of communication channel 210. For example, apparatus 202 may send information to apparatus 204 by way of communication channel 210, apparatus 202 may receive information sent from apparatus 204 by way of communication channel 210, and/or the like. A communication channel, for example, may be a channel utilized for sending and/or receiving of information, data, communications, and/or the like, between two or more apparatuses. It should be understood that communication channel 210 of the example of FIG. 2 illustrates an indirect communication channel between apparatus 202 and apparatus 204. For example, there may be intermediate apparatuses that facilitate communication between apparatus 202 and apparatus 204. For example, there may be one or more routers, hubs, switches, gateways, servers, and/or the like, that are utilized in the communication channels between apparatus 202 and apparatus 204. For example, it can be seen that an intermediate communication channel 210A is present between apparatus 202 and communication channel 210, and an intermediate communication channel 210B is present between apparatus 204 and communication channel 210. In this manner, apparatus 202 may communicate with apparatus 204 by way of communication channels 210A, 210, and 210B. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like.

In the example of FIG. 2, apparatus 202 further communicates with apparatuses 206 and 208 by way of communication channel 210 in a similar manner as described regarding communication between apparatus 202 and apparatus 204. For example, it can be seen that an intermediate communication channel 210C is present between apparatus 206 and communication channel 210, and an intermediate communication channel 210D is present between apparatus 208 and communication channel 210. In a similar manner, in the example of FIG. 2, apparatus 204 may communicate with apparatus 202, 206, and 208, apparatus 206 may communicate with apparatus 202, 204, and 208, and apparatus 208 may communicate with apparatus 202, 204, and 206, and/or the like, by way of communication channels 210, 210A, 210B, 210C, 210D, and/or the like.

In at least one example embodiment, an apparatus and a separate apparatus communicate by way of non-proximity-based communication channels. For example, as depicted in FIG. 2, apparatus 202 communicates with apparatus 204 by way of communication channel 210. In the example of FIG. 2, communication channel 210 may be a local area network communication channel, a wide area network communication channel, an internet communication channel, a cellular communication channel, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of visual display, audio playback, low power radio frequency communication, a radio frequency communication, near field communication, inductive communication, electric field communication, BLUETOOTH communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, an apparatus may be a phone, a tablet, a computer, a navigation system, an automobile, a watercraft, an aircraft, an agricultural implement, an autonomous vehicle, an electronic apparatus, a peripheral apparatus, a host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In the example of FIG. 2, apparatus 202 communicates with apparatus 204 by way of communication channel 214. For example, apparatus 202 may send information to apparatus 204 by way of communication channel 214, apparatus 202 may receive information sent from apparatus 204 by way of communication channel 214, and/or the like. It should be understood that communication channel 214 of the example of FIG. 2 illustrates a direct communication channel between apparatus 202 and apparatus 204. For example, communication channel 214 may lack intermediate apparatuses that facilitate communication between apparatus 202 and apparatus 204. For example, communication channel 214 may be a proximity-based communication channel. In at least one example embodiment, communication that is based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, BLUETOOTH communication, infrared communication, local area network communication, wireless local area network communication, local port communication, input/output port communication, a vehicular ad hoc network similar as described in the Institute of Electrical and Electronics Engineers (IEEE) 802.11 and 802.16 standards, and/or the like. In such an example, the exchange of information may be by way of the short range wireless communication, visual communication, audio communication, and/or the like between the apparatus and a separate apparatus, host apparatus, and/or the like.

In the example of FIG. 2, apparatus 204 communicates with apparatus 206 by way of communication channel 216 in a similar manner as described regarding communication between apparatus 202 and apparatus 204 over communication channel 214. For example, it can be seen that communication channel 216 is a direct communication channel. In the example of FIG. 2, apparatus 206 communicates with apparatus 202 by way of communication channel 212 in a similar manner as described regarding communication between apparatus 202 and apparatus 204 over communication channel 214. For example, it can be seen that communication channel 212 is a direct communication channel. Even though it is not shown in the example of FIG. 2, it should be understood than apparatuses 202, 204, and 206 may communicate with apparatus 208 by way of a direct communication channel in some circumstances. For example, apparatus 202 may communication with apparatus 208 over a direct communication channels when apparatus 202 is proximate to apparatus 208.

In at least one example embodiment, a proximity-based communication channel is a low power radio frequency communication channel, a radio frequency communication channel, a near field communication channel, a wireless communication channel, a wireless local area network communication channel, a BLUETOOTH communication channel, an electric field communication channel, an inductive communication channel, an infrared communication channel, a visual communication channel, an audible communication channel, and/or the like. For example, as depicted in FIG. 2, apparatus 202 communicates with apparatus 204 by way of a communication channel 214. In the example of FIG. 2, communication channel 214 may be a low power radio frequency communication channel, a radio frequency communication channel, a near field communication channel, a wireless communication channel, a wireless local area network communication channel, a BLUETOOTH communication channel, an electric field communication channel, an inductive communication channel, an infrared communication channel, a visual communication channel, an audible communication channel, and/or the like.

Figure 3:
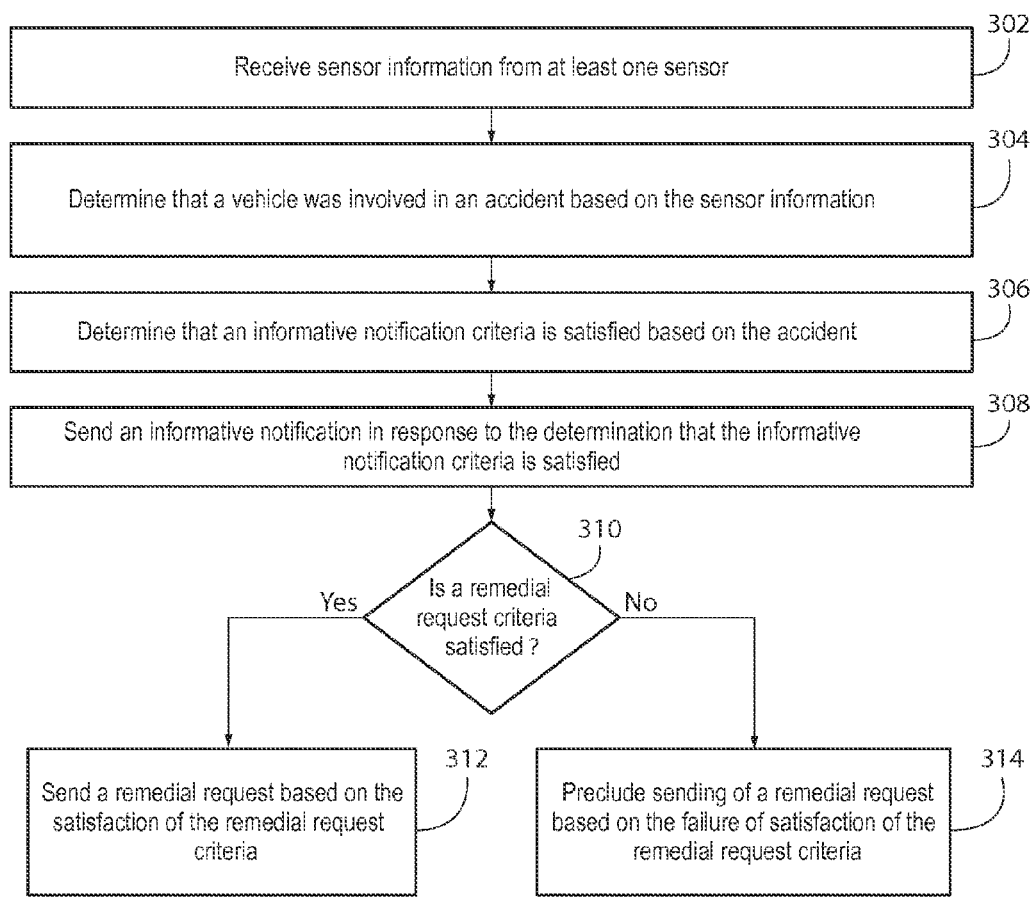
FIG. 3 is a flow diagram illustrating activities associated with determining that a vehicle was involved in an accident according to at least one example embodiment.

FIG. 3 is a flow diagram illustrating activities associated with determining that a vehicle was involved in an accident according to at least one example embodiment. In at least one example embodiment, there is a set of operations that corresponds with the activities of FIG. 3. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 3.

As discussed previously, in many circumstances, a vehicle may receive sensor information from at least one sensor. For example, the vehicle may receive sensor information from a speed sensor, an accelerometer sensor, a vibration sensor, an impact sensor, an audio sensor, a fuel sensor, an oil sensor, a tire pressure monitoring sensor, a smoke sensor, an emissions sensor, airbag sensor, and/or the like. In such circumstances, the vehicle may analyze the sensor information to determine a location of the vehicle, a speed of the vehicle, a trajectory of the vehicle, one or more aspects of the environment surrounding the vehicle, and/or the like. For example, the vehicle may receive speed sensor information from a speed sensor that indicates a speed of the vehicle at a particular time, may receive accelerometer sensor information from an accelerometer sensor that indicates a magnitude and/or direction of acceleration being experienced by the vehicle, and/or the like. In some circumstances, the sensors may be comprised by the vehicle. However, in some circumstances, sensor information from one or more sensors may be received from a separate apparatus, a separate vehicle, and/or the like. For example, the vehicle may receive sensor information that was sent by another vehicle by way of one or more communication channels, as described regarding the example of FIG. 2. In such an example, the other vehicle may comprise one or more sensors, and share at least a portion of the sensor information derived from such sensors with the vehicle.

As discussed previously, a vehicle may be an autonomous vehicle. In such circumstances, since a human occupant may not be present within the vehicle to manage certain situations experienced by the vehicle, it may be desirable to utilize sensor information to determine events that occur with respect to the vehicle. For example, certain events may affect the operation of the vehicle, may necessitate the notification of one or more interested parties, may require the assistance of emergency response, and/or the like. In at least one example embodiment, an apparatus determines that a vehicle was involved in an accident. For example, an accident may be a collision with an object, a collision with another vehicle, a tire blow out, a flat tire, a single vehicle accident, a rollover, and/or the like. Such a determination may be based, at least in part, on the sensor information. For example, the apparatus may receive sensor information from an impact sensor, a glass break sensor, an accelerometer sensor, and/or the like, and determine that the vehicle was involved in an accident based, at least in part, on the sensor information. For example, if the vehicle experiences a sudden deceleration that is beyond a particular threshold, the apparatus may determine that the vehicle was involved in an accident. In another example, if the apparatus receives sensor information from an impact sensor that indicates that a front quarter panel of the vehicle was impacted and sensor information from an airbag sensor that indicates that one or more airbags was deployed, the apparatus may determine that the vehicle was involved in an accident based, at least in part, on the impact and the airbag deployment.

In some circumstances, an apparatus may determine a relative severity of the accident based, at least in part, on the sensor information. The relative severity of the accident may be associated with a force of impact, a number of airbags deployed, the number and location of triggered impact sensors, any sensor information which may be used to infer the amount of damage done to the vehicle during the accident, and/or the like.

Additionally, in some circumstances, it may be desirable to determine an operational state of the vehicle subsequent to occurrence of the accident. For example, the operational state may be a mobility impaired state. A mobility impaired state may indicate circumstances in which the vehicle is incapable of moving itself, in which it is undesirable for the vehicle to move itself, and/or the like. For example, a vehicle may be incapable of moving itself after a failure of its mechanical or electrical components, damage to a tire, and/or the like. In another example, it may be undesirable for a vehicle to move itself in circumstances in which moving the vehicle may cause damage to the vehicle, to another vehicle, to private property, etc., and/or the like. In at least one example embodiment, the operational state is a mobility impaired state. A vehicle that is in the mobility impaired state subsequent to occurrence of the accident may be immobile, and require assistance to be removed from the roadway.

In many circumstances, one or more parties, individuals, companies, and/or the like may desire to be notified of the occurrence of the accident. For example, the owner of the vehicle may desire to be informed as to the occurrence of the accident, the severity of the accident, the location of the accident, and/or the like. In such an example, the owner may desire to dispatch an individual to the scene of the accident, may desire to create a work order for the reconditioning of the vehicle, and/or the like. In another example, an insurance provider retained by the owner of the vehicle may desire to be informed of the occurrence of the accident, the severity of the accident, the location of the accident, and/or the like. In such an example, the insurance provider may be interested in determining a potential claim for insurance reimbursement, identifying which party may be at fault in a multi-party accident, and/or the like. Further, in such an example, it may be desirable to only alert the insurance provider if the owner of the vehicle intends to file a claim with the insurance provider, if the severity of the accident is beyond a certain threshold, and/or the like. In this manner, it may be desirable to send an informative notification to one or more interested parties based, at least in part, on one or more informative notification criteria. An informative notification may be any notification that comprises information about the vehicle, information pertaining to the accident and/or the occurrence of the accident, information indicating a location of the accident, and/or the like. For example, an informative notification may comprise information that identifies the vehicle involved in the accident, a relative severity of the accident, a location of the accident, an operational state of the vehicle, information that indicates whether emergency response assistance was requested, and/or the like. In at least one example embodiment, an informative notification is a notification that fails to request any assistance.

In at least one example embodiment, an apparatus determines that an informative notification criteria is satisfied. For example, an informative notification criteria may be satisfied based, at least in part, on sensor information that indicates a value that is beyond a predetermined threshold, a value that is below a predetermined threshold, a value that is within a range of values associated with a particular sensor, and/or the like. Such thresholds may be set on a per-sensor basis, may be associated with default values by a manufacturer of the vehicle, may be user-adjustable based on a user preference regarding conditions in which one or more notifications are communicated to one or more parties, and/or the like. In this manner, the informative notification criteria may be adaptable, changeable, etc. based on manufacturer information, user preferences, and/or the like. In such an example embodiment, the determination that the informative notification criteria is satisfied is based, at least in part, on the accident, on the occurrence of the accident, on the sensor information that indicates the occurrence of the accident, and/or the like.

The informative notification criteria may be any criteria that may be satisfied by sensor information, a range of sensor information, and/or the like. For example, the informative notification criteria may indicate a threshold value associated with sensor information received from a particular sensor, beyond (or below) which, the informative notification criteria is satisfied. The informative notification criteria may be a weighted average of a plurality of criteria, may be an aggregation of more than one criteria, and/or the like. For example, in some circumstances, satisfaction of a single informative notification criteria may cause sending of an informative notification, while satisfaction of a different single informative notification criteria may fail to cause sending of an informative notification. In such an example, the satisfaction of the different informative notification criteria may be necessary, but not sufficient, to cause sending of the informative notification. In some circumstances, satisfaction of a plurality of informative notification criteria may cause sending of the informative notification. In this manner, the informative notification criteria may be implemented by way of case statements, if-then statements, an aggregation of informative notification criteria, and/or the like. In at least one example embodiment, the apparatus causes sending of an informative notification in response to the determination that the informative notification criteria is satisfied.

In some circumstances, it may be desirable to selectively communicate an informative notification based, at least in part, on a relative severity of an accident. For example, an informative notification criteria may be satisfied based, at least in part, on an accident severity value (e.g., a severity scale that may be, for example, 0 to 100, 0 to 10, etc.), an accident severity category (e.g., high, low, medium, fender bender, scratch, etc.), and/or the like. The accident severity value, the accident severity category, and/or the like may be determined based, at least in part, on sensor information received from one or more sensors, such as vibration sensors, seat belt sensors, airbag sensors, impact sensors, etc., on a location of the accident, such as a highway versus a county road, and/or the like. In such an example, the accident severity value, the accident severity category, and/or the like may indicate an accident severity value that is beyond a predetermined threshold, an accident severity category that is below a predetermined threshold, and/or the like. As such, an apparatus may send an informative notification in response to occurrence of an accident with an accident severity category of high (e.g., an accident on the highway, a multiple-vehicle accident, etc.), while the apparatus may avoid sending an informative notification in response to occurrence of an accident with an accident severity value of 2 out of 100 (e.g., the vehicle clipped a curb while turning, received a very low speed bump at a stop sign, etc.). In this manner, one or more thresholds may be configured such that an informative notification may be sent in circumstances that warrant such a communication, and precluded from being sent in response to an inconsequential accident.

In at least one example embodiment, the informative notification is an owner informative notification. An owner informative notification may be a notification communicated to an owner of the vehicle, a registered party associated with the vehicle, a fleet manager in charge of operations associated with the vehicle, an agent and/or employee of the owner of the vehicle, a database that is accessible by the owner of the vehicle, and/or the like. The owner informative notification may comprise information that indicates the vehicle involved in the accident, a relative severity of the accident, a location of the accident, an operational state of the vehicle, information that indicates whether emergency response assistance was requested, and/or the like.

In at least one example embodiment, the informative notification is an insurance informative notification. An insurance informative notification may be a notification communicated to an insurance provider of the vehicle, a registered party associated with the vehicle, an insurance agent in charge of managing the insurance on the vehicle, an agent and/or employee of the insurance provider, a database that is accessible by the insurance provider, and/or the like. The insurance informative notification may comprise information that indicates the vehicle involved in the accident, one or more other vehicles involved in the accident, a relative severity of the accident, a location of the accident, an operational state of the vehicle, information that indicates whether emergency response assistance was requested, and/or the like.

In at least one example embodiment, the informative notification is a property owner informative notification. A property owner informative notification may be a notification communicated to an owner of separate property that was involved in the accident, an owner of real property that was the scene of the accident, a database that is accessible by the other property owner, and/or the like. For example, a vehicle may collide with a parked car owned by the other property owner, may impact a fence or mailbox owned by the other property owner, and/or the like. In this manner, it may be desirable to notify the other property owner as to the occurrence of the accident in order to satisfy any legal obligations regarding notification, reimbursement, compensation, and/or the like. The property owner informative notification may comprise information that indicates the vehicle involved in the accident, the owner of the vehicle, vehicle insurance information associated with an insurance policy covering the vehicle, one or more other vehicles involved in the accident, owners of the one or more other vehicles, a relative severity of the accident, an object damaged in the accident, a location of the accident, and/or the like.

In many circumstances, occurrence of an accident may block traffic, may impede the flow of traffic, may delay travel times for other motorists, and/or the like. Further, the arrival of emergency response vehicles, tow trucks, and/or the like may further impede traffic, resulting in gridlock. Modern mapping applications, navigational services, etc. often utilize traffic data, current traffic congestion conditions, accident tracking, and/or the like to plot time efficient navigational routes, to bypass heavily congested thoroughfares, to avoid the scene of an accident, and/or the like. As such, it may be desirable to communicate information to one or more service providers that maintains repositories, databases, etc. for such information. In at least one example embodiment, the informative notification is a service provider informative notification. The property owner informative notification may comprise information that indicates a number of vehicles involved in the accident, a type of vehicle involved in the accident, an operational state of the vehicle (i.e. immobile), a relative severity of the accident, a location of the accident, one or more specific lanes affected by the accident, whether emergency response assistance was requested, and/or the like.

In some circumstances, it may be desirable to notify more than one party as to the occurrence of the accident. For example, it may be desirable to convey certain information to the owner of the vehicle, different information to an insurance provider, and other information to another property owner. In such an example, the informative notification criteria for each of the owner, the insurance provider, and the other property owner may differ from each other, may be independent, and/or the like. In this manner, the apparatus may determine that an informative notification criteria for an owner informative notification is satisfied and send an owner informative notification to the owner, may determine that an informative notification criteria for an insurance informative notification is satisfied and send an insurance informative notification to the insurance provider, but may determine that an informative notification criteria for a property owner informative notification fails to be satisfied and precludes sending a property owner informative notification to another property owner. For example, the accident may failed to involve any other property belonging to another property owner. In at least one example embodiment, an apparatus determines that another informative notification criteria is satisfied based, at least in part, on the accident, and causes sending of another informative notification in response to the determination that the other informative notification criteria is satisfied. In at least one example embodiment, an apparatus determines that another informative notification criteria fails to be satisfied based, at least in part, on the accident, and precludes sending of another informative notification in response to the determination that the other informative notification criteria fails to be satisfied.

In many circumstances, one or more remedial measures may be necessary in response to the occurrence of the accident. For example, it may be desirable to notify an emergency responder as to the occurrence of the accident, the severity of the accident, the location of the accident, and/or the like. In such an example, the emergency responder may desire to dispatch one or more emergency response vehicles, such as a police vehicle, a fire truck, an ambulance, and/or the like, to the scene of the accident, and/or the like. In another example, the vehicle may be immobile and, thus, it may be desirable to notify a tow assistance provider as to the occurrence of the accident, the severity of the accident, the location of the accident, and/or the like. In such an example, the tow assistance provider may be interested in determining a route to the scene of the accident, a type of tow truck to dispatch (i.e. flat-bed, heavy duty tractor, etc.), and/or the like. Further, in such an example, it may be desirable to only alert the tow assistance provider if the vehicle is immobile, if the severity of the accident is beyond a certain threshold, if a roadside service assistance provider is unavailable, and/or the like. In this manner, it may be desirable to send a remedial request to one or more interested parties based, at least in part, on one or more remedial request criteria. A remedial request may be any request that comprises information about the vehicle, information pertaining to the accident and/or the occurrence of the accident, information indicating a location of the accident, informative requesting a particular type of assistance, an indication of the relative severity of the accident, and/or the like. For example, a remedial request may comprise information that identifies the vehicle involved in the accident, a relative severity of the accident, a location of the accident, an operational state of the vehicle, information that indicates a type of emergency response assistance requested, a type of object involved in the accident, whether any humans, animals, etc. were present at the scene of the accident, and/or the like.

In at least one example embodiment, an apparatus determines whether a remedial request criteria is satisfied. In such an example embodiment, the determination of whether the remedial request criteria is satisfied may be based, at least in part, on the accident, on the occurrence of the accident, on any sensor information received by the vehicle, and/or the like. The remedial request criteria may be any criteria that may be satisfied by sensor information, a range of sensor information, and/or the like. For example, the remedial request criteria may indicate a threshold value associated with sensor information received from a particular sensor, beyond (or below) which, the informative notification criteria is satisfied. Such thresholds, ranges, values, etc. associated with one or more remedial request criteria may be set on a per-sensor basis, may be associated with default values by a manufacturer of the vehicle, may be user-adjustable based on a user preference regarding conditions in which one or more notifications are communicated to one or more parties, and/or the like. In this manner, the remedial request criteria may be adaptable, changeable, etc. based on manufacturer information, user preferences, and/or the like. In some circumstances, it may be desirable to preclude modification of one or more remedial request criteria. For example, a manufacturer of a vehicle may desire to preclude modification of a remedial request criteria that, if satisfied, causes sending of a remedial request to an emergency medical service provider. For example, if a person is involved in an accident (i.e. the person is struck by the vehicle, the vehicle is involved in an accident with an occupied vehicle, etc.), it may be desirable to preclude modification of a remedial request criteria that sends a remedial request in response to a determination that a person was involved in the accident.

The remedial request criteria may be a weighted average of a plurality of criteria, may be an aggregation of more than one criteria, and/or the like. For example, in some circumstances, satisfaction of a single remedial request criteria may cause sending of a remedial request, while satisfaction of a different single remedial request criteria may fail to cause sending of a remedial request. In such an example, the single remedial request criteria may be satisfied based, at least in part, on the involvement of a person in the accident. As such, for example, if a pedestrian is struck in the accident, the remedial request criteria may be satisfied regardless of any other sensor information and/or other remedial request criteria, and a remedial request may be sent. In such an example, the satisfaction of the different remedial request criteria may be necessary, but not sufficient, to cause sending of the remedial request. In some circumstances, satisfaction of a plurality of remedial request criteria may cause sending of the remedial request. In this manner, the remedial request criteria may be implemented by way of case statements, if-then statements, an aggregation of remedial request criteria, and/or the like. In circumstances where the remedial request criteria is satisfied, the apparatus may send a remedial request based, at least in part, on the satisfaction of the remedial request criteria. In circumstances where the remedial request criteria fails to be satisfied, the apparatus may preclude sending of the remedial request based, at least in part, on the failure of satisfaction of the remedial request criteria. In this manner, in at least one example embodiment, the apparatus causes sending of a remedial request in response to the determination that the remedial request criteria is satisfied.

In some circumstances, it may be desirable to notify an emergency responder as to the occurrence of an accident and/or request the assistance of such emergency responders. For example, it may be desirable to request assistance from a police department, a fire department, a medical assistance provider, and/or the like. In at least one example embodiment, the remedial request criteria is an emergency assistance request criteria, and the remedial request is an emergency assistance request.

In some circumstances, it may be desirable to notify and/or request assistance from a police department. For example, a police officer may be able to provide documentation of the accident for insurance purposes, may be able to determine and assign fault in the occurrence of the accident, may direct traffic around the accident, and/or the like. In at least one example embodiment, the emergency assistance request is a police assistance request. In such an example embodiment, the emergency assistance request criteria is a police assistance criteria. In this manner, if the police assistance criteria is satisfied based, at least in part, on the accident and the sensor information, the apparatus may cause sending of a police assistance request to a dispatcher, a police department, a state trooper department, and/or the like.

In some circumstances, it may be desirable to notify and/or request assistance from a fire department. For example, a fire fighter may be able to provide physical assistance in moving an immobile vehicle, fire suppression services, may assist in freeing a trapped person, may direct traffic around the accident, and/or the like. In at least one example embodiment, the emergency assistance request is a fire assistance request. In such an example embodiment, the emergency assistance request criteria is a fire assistance criteria. The fire assistance criteria may be satisfied in circumstances in which an person was involved in the accident, there is a trapped occupant in the vehicle, a fire hazard has been identified based, at least in part, on sensor information received from a fuel sensor, oil sensor, battery sensor, etc., and/or the like. For example, the sensor information received from the fuel sensor may indicate a drop in fuel pressure, a reduction in fuel volume, etc., which may indicate a fuel leak. In another example, the sensor information received from the battery sensor may indicate that a battery pack comprised by the vehicle was damaged, that the battery terminals have been shorted, and/or the like. In this manner, if the fire assistance criteria is satisfied based, at least in part, on the accident and the sensor information, the apparatus may cause sending of a fire assistance request to a dispatcher, a fire department, and/or the like.

In some circumstances, it may be desirable to notify and/or request assistance from a provider of emergency medical services. For example, an emergency medical services provider may arrive in an ambulance that is configured to treat injuries, to transport an injured person to a hospital for continued treatment, to airlift a critically injured person to a regional trauma center, and/or the like. In at least one example embodiment, the emergency assistance request is a medical assistance request. The medical assistance request may be sent to different emergency medical service providers based, at least in part, on a relative severity of the accident, a number of persons involved in the accident, and/or the like. For example, a more severe accident may result in a more significant injury and, thus, necessitate an airlift. In another example, a distance from a regional trauma center may make helicopter transportation more desirable than ambulance transportation. In such an example embodiment, the emergency assistance request criteria is a medical assistance criteria. The medical assistance criteria may be satisfied in circumstances in which a person was involved in the accident, there is a trapped occupant in the vehicle, there is an unresponsive individual in the vehicle, and/or the like. For example, sensor information received for an occupancy sensor may indicate that the vehicle is occupied by a person, but the person is remaining still, the person's heartbeat and/or respiration rate is erratic, and/or the like. In another example, the sensor information may indicate that the vehicle collided with a pedestrian during the accident, that another vehicle involved in the accident collided with a pedestrian, and/or the like. In this manner, if the medical assistance criteria is satisfied based, at least in part, on the accident and the sensor information, the apparatus may cause sending of a medical assistance request to a dispatcher, a fire department, a hospital, an emergency medical services provider, and/or the like.

In many circumstances, it may be desirable to determine an object struck in an accident, a type of object that the vehicle collided with, and/or the like. For example, it may be desirable to send a medical assistance request in response to the occurrence of any accident involving a person. In at least one example embodiment, an apparatus determines a type of object involved in the accident. In such an example embodiment, the satisfaction of the medical assistance criteria may be based, at least in part, on the type of object involved in the accident. In at least one example embodiment, the determination of the type of object involved in the accident comprises receipt of other sensor information that represents the environment surround the vehicle at a time prior to the accident. The apparatus may identify the type of object involved in the accident based, at least in part, on the other sensor information. For example, the other sensor information may be image information, infrared information, radar information, and/or the like, and the identification of the type of object involved in the accident may be based, at least in part, on the image information, the infrared information, the radar information, and/or the like. For example, a vehicle may comprise a forward-facing camera module that captured an inattentive pedestrian stepping out of a curb into the path of the vehicle. The image information captured by the camera module may be analyzed, processed, have image recognition procedures performed, etc. that facilitate identification of the object, the type of object, etc. If it is determined that the vehicle collided with an object determined to be a person, the apparatus may automatically send a medical assistance request based, at least in part, on satisfaction of a medical assistance request criteria that is satisfied if a person was involved in the accident.

In some circumstances, it may be desirable to notify and/or request assistance from a provider of site remediation services. For example, a site remediation service provider may be a provider of tow assistance, site clean-up assistance, roadside service assistance, and/or the like. In this manner, a site remediation service may be any service that deals with remediation of the scene of the accident, clearing of the vehicles and/or debris from the roadway, repairing of the vehicle, and/or the like.

In some circumstances, it may be desirable to notify and/or request assistance from a tow assistance provider. For example, a tow assistance provider may be able to provide physical assistance in moving an immobile vehicle, may direct traffic around the accident, may clear the roadway to allow traffic to flow around the accident, and/or the like. In at least one example embodiment, the site remedy request is a tow assistance request. In such an example embodiment, the site remedy assistance criteria is a tow assistance criteria. The tow assistance criteria may be satisfied in circumstances in which a vehicle is determined to be immobile, the operational state of the vehicle is unknown, the severity of the accident is sufficiently high so as to make remediation by way of roadside service unlikely, and/or the like. For example, the sensor information received from the fuel sensor may indicate a drop in fuel pressure, a reduction in fuel volume, etc., which may indicate a fuel leak. In another example, the sensor information received from the battery sensor may indicate that a battery pack comprised by the vehicle was damaged, that the battery terminals have been shorted, and/or the like. In another example, the sensor information received from an accelerometer sensor may indicate that the accident was extremely severe and that the vehicle has sustained heavy damage and is likely immobile. In this manner, if the tow assistance criteria is satisfied based, at least in part, on the accident and the sensor information, the apparatus may cause sending of a tow assistance request to a dispatcher, a tow assistance provider, and/or the like.

In some circumstances, it may be desirable to notify and/or request assistance from a clean-up assistance provider. For example, a clean-up assistance provider may be able to provide physical assistance in moving an immobile vehicle, may direct traffic around the accident, may clear the roadway of debris, fuel, and/or oil leakage to allow traffic to flow around the accident, and/or the like. In at least one example embodiment, the site remedy request is a clean-up assistance request. In such an example embodiment, the site remedy assistance criteria is a clean-up assistance criteria. The clean-up assistance criteria may be satisfied in circumstances in which there is a high probability of debris on the roadway, the severity of the accident is sufficiently high so as to make debris on the roadway likely, there is a fuel and/or oil leak, and/or the like. For example, the sensor information received from the oil sensor may indicate a drop in oil pressure, a reduction in oil volume, etc., which may indicate an oil leak. In another example, the sensor information received from a glass break sensor may indicate that one or more windows of the vehicle shattered during the accident. In this manner, if the clean-up assistance criteria is satisfied based, at least in part, on the accident and the sensor information, the apparatus may cause sending of a clean-up assistance request to a dispatcher, a clean-up assistance provider, and/or the like.

In some circumstances, it may be desirable to notify and/or request assistance from a roadside service assistance provider. For example, a roadside service assistance provider may be able to provide physical assistance in moving an immobile vehicle, may repair an immobile vehicle such that the vehicle is again mobile and/or operational, and/or the like. In at least one example embodiment, the site remedy request is a roadside service assistance request. In such an example embodiment, the site remedy assistance criteria is a roadside service assistance criteria. The roadside service assistance criteria may be satisfied in circumstances in which a vehicle is determined to be immobile, the operational state of the vehicle is unknown, the severity of the accident is sufficiently moderate so as to make remediation by way of roadside service likely, and/or the like. For example, the sensor information received from the fuel sensor may indicate a drop in fuel pressure, a reduction in fuel volume, etc., which may indicate a fuel leak. In another example, the sensor information received from the battery sensor may indicate that a battery pack comprised by the vehicle was damaged, that the battery terminals have been shorted, and/or the like. In another example, the sensor information received from an accelerometer sensor may indicate that the accident was sufficiently moderate so as to make repair by way of a roadside service assistance provider likely. In yet another example, the sensor information received from a tire pressure monitoring sensor may indicate that the vehicle has one or more flat tires. As such, the roadside service assistance criteria may be satisfied by a value, a range of values, etc. associated with a tire pressure monitoring sensor, an oil sensor, a fuel sensor, a battery sensor, an operational state of the vehicle, and/or the like. In this manner, if the roadside service assistance criteria is satisfied based, at least in part, on the accident and the sensor information, the apparatus may cause sending of a roadside service assistance request to a dispatcher, a roadside service assistance provider, and/or the like.

In some circumstances, it may be desirable to avoid sending of a roadside service assistance request. For example, if a tow assistance request has already been sent to a tow assistance service provider, it may be desirable to avoid also sending a roadside service assistance request to a roadside service assistance provider. In at least one example embodiment, an apparatus determines that a tow assistance request has been sent. In such an example embodiment, the apparatus may preclude sending of any roadside service assistance request based, at least in part, on the determination that the tow assistance request has been sent. Alternatively, in at least one example embodiment, an apparatus determines that a tow assistance request fails to have been sent. In such an example embodiment, the sending of the roadside service assistance request may be based, at least in part, on the determination that the tow assistance request fails to have been sent.

In some circumstances, a location of an accident may influence the desirability of sending a remedial request to one or more parties. For example, if an accident occurs on a highway, it may be especially important to quickly move the vehicle, clear the accident, clean the scene of the accident, and/or the like. In another example, if an accident occurs on a highway, it may be assumed that the accident is of a greater severity than if the accident occurred on a surface road, an arterial road, and/or the like. As such, one or more remedial request criteria may be based, at least in part, on a location of the vehicle, on a location of the accident, on a location of the vehicle at the occurrence of the accident, and/or the like. In this manner, one or more sensor information thresholds, ranges, values, etc. indicated by a remedial request criteria may be based, at least in part, on the location of the vehicle. For example, if the accident occurred while the vehicle was traversing a railroad crossing, one or more thresholds associated with the sending of a tow assistance request, a police assistance request, a fire assistance request, and/or the like may be reduced such that it is more likely that such assistance requests will be sent to the respective assistance providers.

In some circumstances, it may be desirable to request the assistance of more than one party in response to occurrence of the accident. For example, in response to a single accident, it may be desirable to request remedial assistance from the police, the fire department, an emergency medical services provide, a tow assistance provider, and a clean-up assistance provider. In such an example, the remedial request criteria for each of the aforementioned providers may differ from each other, may be independent, and/or the like. In this manner, the apparatus may determine that a police assistance criteria for a police assistance request is satisfied and send a police assistance request to a police department, may determine that a tow assistance criteria for a tow assistance request is satisfied and send a tow assistance request to the tow assistance provider, but may determine that a roadside service assistance criteria for a roadside service assistance request fails to be satisfied and preclude sending a roadside service assistance request to any roadside service assistance provider. In at least one example embodiment, an apparatus determines that another remedial request criteria is satisfied based, at least in part, on the accident and the sensor information. In such an example embodiment, in circumstances where the other remedial request criteria is satisfied, the apparatus may send another remedial request based, at least in part, on the satisfaction of the other remedial request criteria. In such an example embodiment, in circumstances where the other remedial request criteria fails to be satisfied, the apparatus may preclude sending of the other remedial request based, at least in part, on the failure of satisfaction of the other remedial request criteria.

At block 302, the apparatus receives sensor information from at least one sensor. The receipt, the sensor information, and the sensor may be similar as described regarding FIG. 2.

At block 304, the apparatus determines that a vehicle was involved in an accident based, at least in part, on the sensor information. The vehicle may be similar as described regarding FIG. 2.

At block 306, the apparatus determines that an informative notification criteria is satisfied based, at least in part, on the accident.

At block 308, the apparatus sends an informative notification in response to the determination that the informative notification criteria is satisfied. The sending may be similar as described regarding FIG. 2.

At block 310, the apparatus determines whether a remedial request criteria is satisfied based, at least in part, on the accident and the sensor information. If the apparatus determines that the remedial request criteria is satisfied, flow proceeds to block 312. If the apparatus determines that the remedial request criteria fails to be satisfied, flow proceeds to block 314.

At block 312, the apparatus, in circumstances where the remedial request criteria is satisfied, sends a remedial request based, at least in part, on the satisfaction of the remedial request criteria. The sending may be similar as described regarding FIG. 2.

At block 314, the apparatus, in circumstances where the remedial request criteria fails to be satisfied, precludes sending of the remedial request based, at least in part, on the failure of satisfaction of the remedial request criteria.

Figure 4:
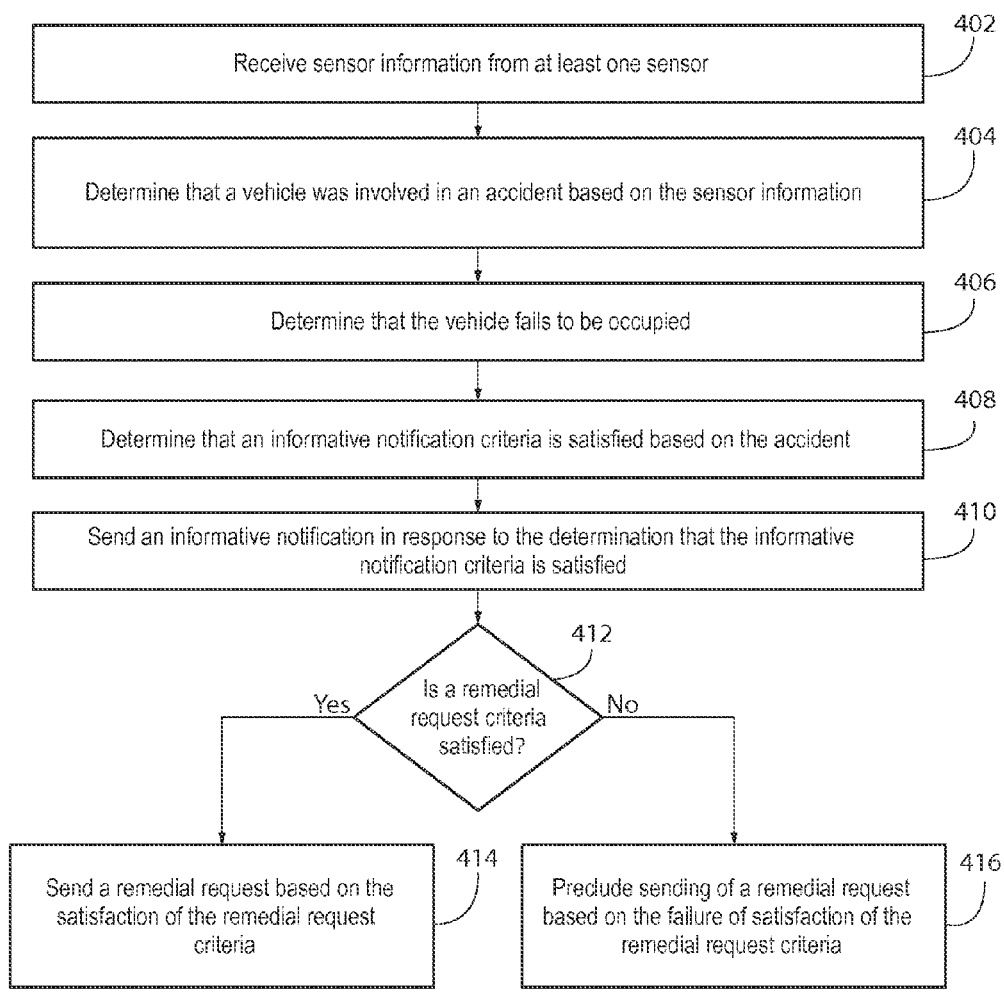
FIG. 4 is a flow diagram illustrating activities associated with determining that the vehicle fails to be occupied according to at least one example embodiment.

FIG. 4 is a flow diagram illustrating activities associated with determining that the vehicle fails to be occupied according to at least one example embodiment. In at least one example embodiment, there is a set of operations that corresponds with the activities of FIG. 4. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 4.

In some circumstances, a vehicle may be occupied by a human operator, passenger, driver, etc. In such circumstances, it may be assumed that the person occupying the vehicle may take responsibility for notifying the proper parties as to the occurrence of the accident, may analyze the situation and decide to request emergency assistance, and/or the like. As such, in such circumstances, it may be desirable to preclude automatically sending any informative notifications, remedial requests, and/or the like. In at least one example embodiment, an apparatus determines that the vehicle is occupied, and precludes sending of any informative notifications, remedial requests, and/or the like based, at least in part, on the determination that the vehicle is occupied. The determination that the vehicle is occupied may be based, at least in part, on sensor information received from an occupancy sensor, a weight sensor, receipt of manual user interface inputs, and/or the like. As discussed previously, in circumstances in which there fails to be a human operator of the vehicle, it may be desirable to automate one or more processes in response to occurrence of an accident. For example, a vehicle may be an autonomous vehicle that may operate without assistance from a human operator, driver, etc. In at least one example embodiment, an apparatus determines that the vehicle fails to be occupied. For example, the apparatus may receive additional sensor information from at least one sensor, such as an occupancy sensor, a weight sensor, and/or the like. In such an example, the determination that the vehicle fails to be occupied may be based, at least in part, on the additional sensor information. In this manner, the determination that the informative notification criteria is satisfied, the sending of the informative notification, the determination of whether the remedial request criteria is satisfied, the sending of the remedial request, and/or the like, may each be based, at least in part, on the determination that the vehicle fails to be occupied.

At block 402, the apparatus receives sensor information from at least one sensor. The receipt, the sensor information, and the sensor may be similar as described regarding FIG. 2 and FIG. 3.

At block 404, the apparatus determines that a vehicle was involved in an accident based, at least in part, on the sensor information. The determination, the vehicle, and the accident may be similar as described regarding FIG. 2 and FIG. 3.

At block 406, the apparatus determines that the vehicle fails to be occupied.

At block 408, the apparatus determines that an informative notification criteria is satisfied based, at least in part, on the accident. The determination and the informative notification criteria may be similar as described regarding FIG. 3.

At block 410, the apparatus sends an informative notification in response to the determination that the informative notification criteria is satisfied. The sending and the informative notification may be similar as described regarding FIG. 2 and FIG. 3.

At block 412, the apparatus determines whether a remedial request criteria is satisfied based, at least in part, on the accident and the sensor information. If the apparatus determines that the remedial request criteria is satisfied, flow proceeds to block 414. If the apparatus determines that the remedial request criteria fails to be satisfied, flow proceeds to block 416. The determination and the remedial request criteria may be similar as described regarding FIG. 3.

At block 414, the apparatus, in circumstances where the remedial request criteria is satisfied, sends a remedial request based, at least in part, on the satisfaction of the remedial request criteria. The sending and the remedial request may be similar as described regarding FIG. 2 and FIG. 3.

At block 416, the apparatus, in circumstances where the remedial request criteria fails to be satisfied, precludes sending of the remedial request based, at least in part, on the failure of satisfaction of the remedial request criteria. The preclusion of sending the remedial request may be similar as described regarding FIG. 3.

Figure 5:
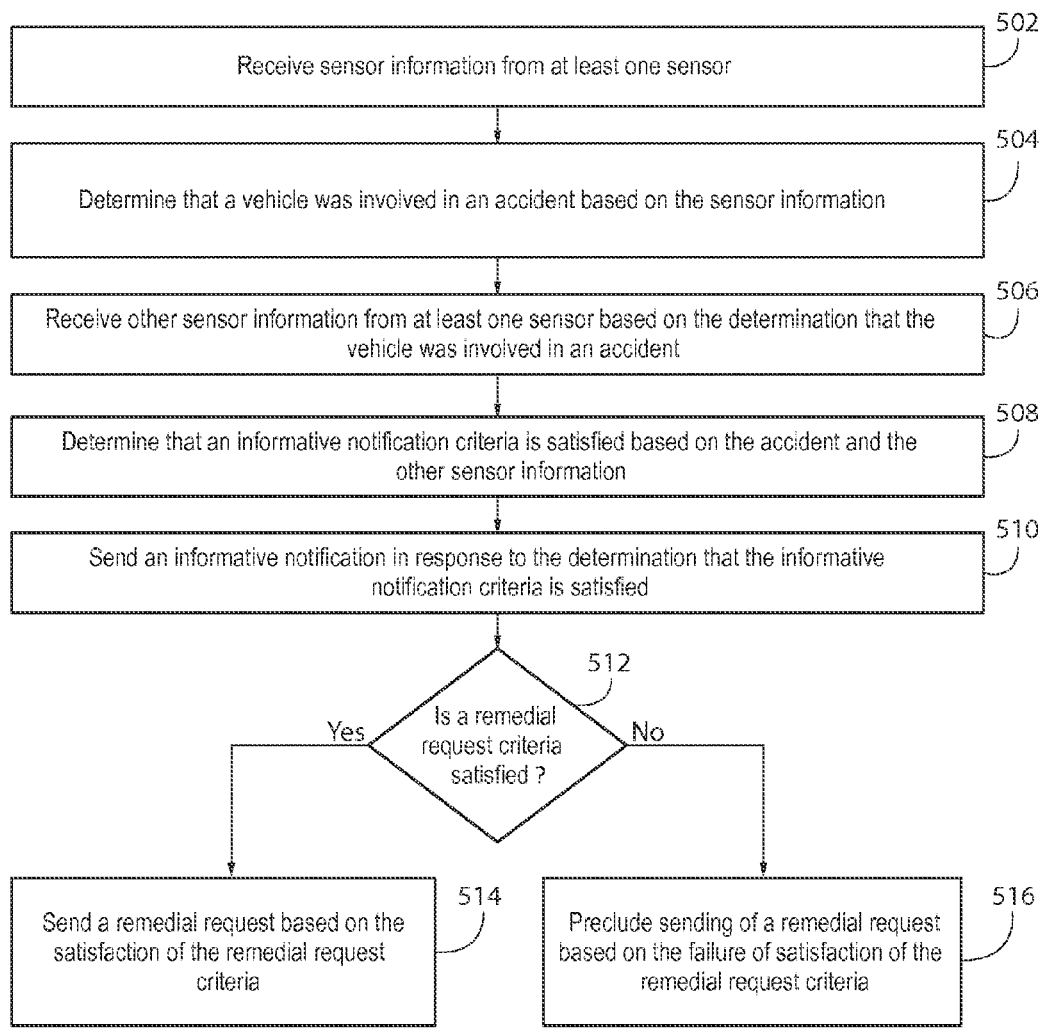
FIG. 5 is a flow diagram illustrating activities associated with receiving other sensor information from at least one sensor according to at least one example embodiment.

FIG. 5 is a flow diagram illustrating activities associated with receiving other sensor information from at least one sensor according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 5.

In some circumstances, the sensor information utilized to determine that the vehicle was involved in an accident may be insufficient to determine whether an informative notification criteria or a remedial request criteria is satisfied. For example, the sensor information that indicates that the accident occurred may merely indicate that there was a collision, but may fail to indicate a severity of the collision, an operational state of the vehicle, whether a fire risk is present, and/or the like. As such, it may be desirable to utilize additional sensor information received prior to and/or subsequent to the occurrence of the accident. In at least one example embodiment, an apparatus receives other sensor information from at least one sensor in response to the determination that the vehicle was involved in an accident. In such an example embodiment, the satisfaction of the informative notification criteria may be based, at least in part, on the other sensor information. Similarly, in such an example embodiment, the satisfaction of the remedial request criteria may be based, at least in part, on the other sensor information. The other sensor information may be sensor information received during a predetermined duration prior to the occurrence of the accident, a predetermined duration subsequent to the occurrence of the accident, and/or the like.

At block 502, the apparatus receives sensor information from at least one sensor. The receipt, the sensor information, and the sensor may be similar as described regarding FIG. 2 and FIG. 3.

At block 504, the apparatus determines that a vehicle was involved in an accident based, at least in part, on the sensor information. The determination, the vehicle, and the accident may be similar as described regarding FIG. 2 and FIG. 3.

At block 506, the apparatus receives other sensor information from at least one sensor based, at least in part, on the determination that the vehicle was involved in an accident. The receipt, the other sensor information, and the sensor may be similar as described herein.

At block 508, the apparatus determines that an informative notification criteria is satisfied based, at least in part, on the accident and the other sensor information. The determination and the informative notification criteria may be similar as described herein.

At block 510, the apparatus sends an informative notification in response to the determination that the informative notification criteria is satisfied. The sending and the informative notification may be similar as described regarding FIG. 2 and FIG. 3.

At block 512, the apparatus determines whether a remedial request criteria is satisfied based, at least in part, on the accident, the sensor information, and the other sensor information. If the apparatus determines that the remedial request criteria is satisfied, flow proceeds to block 512. If the apparatus determines that the remedial request criteria fails to be satisfied, flow proceeds to block 514. The determination and the remedial request criteria may be similar as described regarding FIG. 3.

At block 514, the apparatus, in circumstances where the remedial request criteria is satisfied, sends a remedial request based, at least in part, on the satisfaction of the remedial request criteria. The sending and the remedial request may be similar as described regarding FIG. 2 and FIG. 3.

At block 516, the apparatus, in circumstances where the remedial request criteria fails to be satisfied, precludes sending of the remedial request based, at least in part, on the failure of satisfaction of the remedial request criteria. The preclusion of sending the remedial request may be similar as described regarding FIG. 3.

Figure 6:
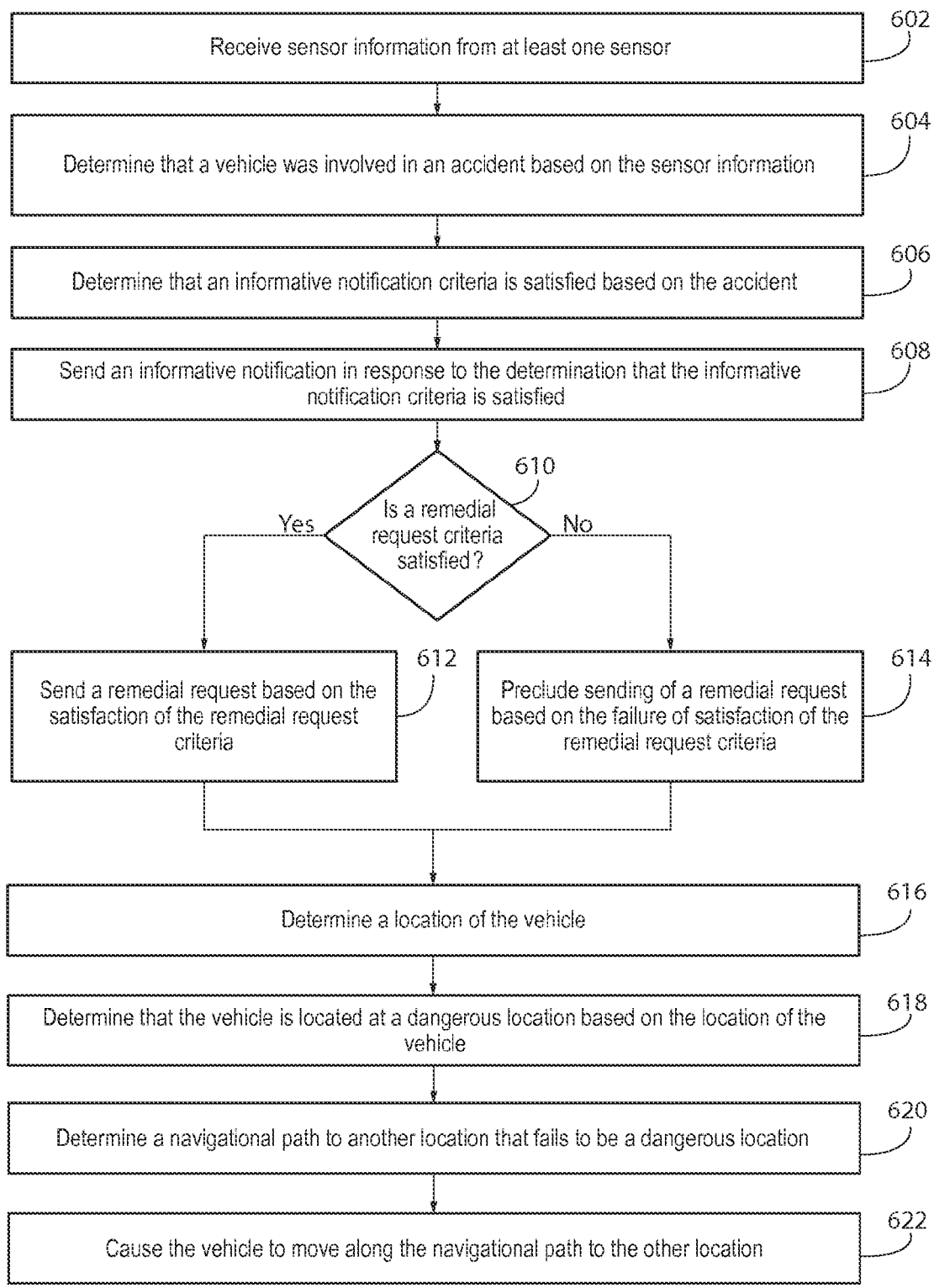
FIG. 6 is a flow diagram illustrating activities associated with determining that the vehicle is located at a dangerous location according to at least one example embodiment.

FIG. 6 is a flow diagram illustrating activities associated with determining that the vehicle is located at a dangerous location according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 6.

In some circumstances, a vehicle may unnecessarily impede the flow of traffic, may be precariously located, and/or otherwise be positioned in a dangerous location subsequent to the occurrence of the accident. In such circumstances, if the operational state of the vehicle subsequent to the occurrence of the accident is such that the vehicle is mobile, it may be desirable to automatically relocate the vehicle from the dangerous location to a different location that fails to be a dangerous location. For example, while the vehicle is waiting for assistance to arrive in response to the sending of a remedial request, it may be desirable to reduce the impact that the vehicle has on the flow of traffic, to reduce the risk of a subsequent accident due to the vehicle being in a dangerous location, and/or the like. A dangerous location may be a location in the middle of a highway, on top of a railroad track, on a steep slope, adjacent to a cliff, in a storm water ravine, and/or the like. For example, it may be desirable to move the vehicle from a primary lane of a highway to a shoulder of the highway. In at least one example embodiment, an apparatus determines a location of the vehicle. In such an example embodiment, the apparatus may determine that the vehicle is located at a dangerous location based, at least in part, on the location of the vehicle. For example, the apparatus may receive map information and determine that the vehicle is location at a dangerous location is based, at least in part, on the location of the vehicle and the map information. The apparatus may then determine a navigational path to another location that fails to be a dangerous location, and cause the vehicle to move along the navigational path to the other location.

At block 602, the apparatus receives sensor information from at least one sensor. The receipt, the sensor information, and the sensor may be similar as described regarding FIG. 2 and FIG. 3.

At block 604, the apparatus determines that a vehicle was involved in an accident based, at least in part, on the sensor information. The determination, the vehicle, and the accident may be similar as described regarding FIG. 2 and FIG. 3.

At block 606, the apparatus determines that an informative notification criteria is satisfied based, at least in part, on the accident. The determination and the informative notification criteria may be similar as described regarding FIG. 3.

At block 608, the apparatus sends an informative notification in response to the determination that the informative notification criteria is satisfied. The sending and the informative notification may be similar as described regarding FIG. 2 and FIG. 3.

At block 610, the apparatus determines whether a remedial request criteria is satisfied based, at least in part, on the accident and the sensor information. If the apparatus determines that the remedial request criteria is satisfied, flow proceeds to block 612. If the apparatus determines that the remedial request criteria fails to be satisfied, flow proceeds to block 614. The determination and the remedial request criteria may be similar as described regarding FIG. 3.

At block 612, the apparatus, in circumstances where the remedial request criteria is satisfied, sends a remedial request based, at least in part, on the satisfaction of the remedial request criteria. The sending and the remedial request may be similar as described regarding FIG. 2 and FIG. 3.

At block 614, the apparatus, in circumstances where the remedial request criteria fails to be satisfied, precludes sending of the remedial request based, at least in part, on the failure of satisfaction of the remedial request criteria. The preclusion of sending the remedial request may be similar as described regarding FIG. 3.

At block 616, the apparatus determines a location of the vehicle. The location of the vehicle may be similar as described regarding FIG. 2.

At block 618, the apparatus determines that the vehicle is located at a dangerous location based, at least in part, on the location of the vehicle.

At block 620, the apparatus determines a navigational path to another location that fails to be a dangerous location.

At block 622, the apparatus causes the vehicle to move along the navigational path to the other location. The causation of the vehicle to move along the navigational path to the other location may be similar as described regarding FIG. 2.

Figure 7:
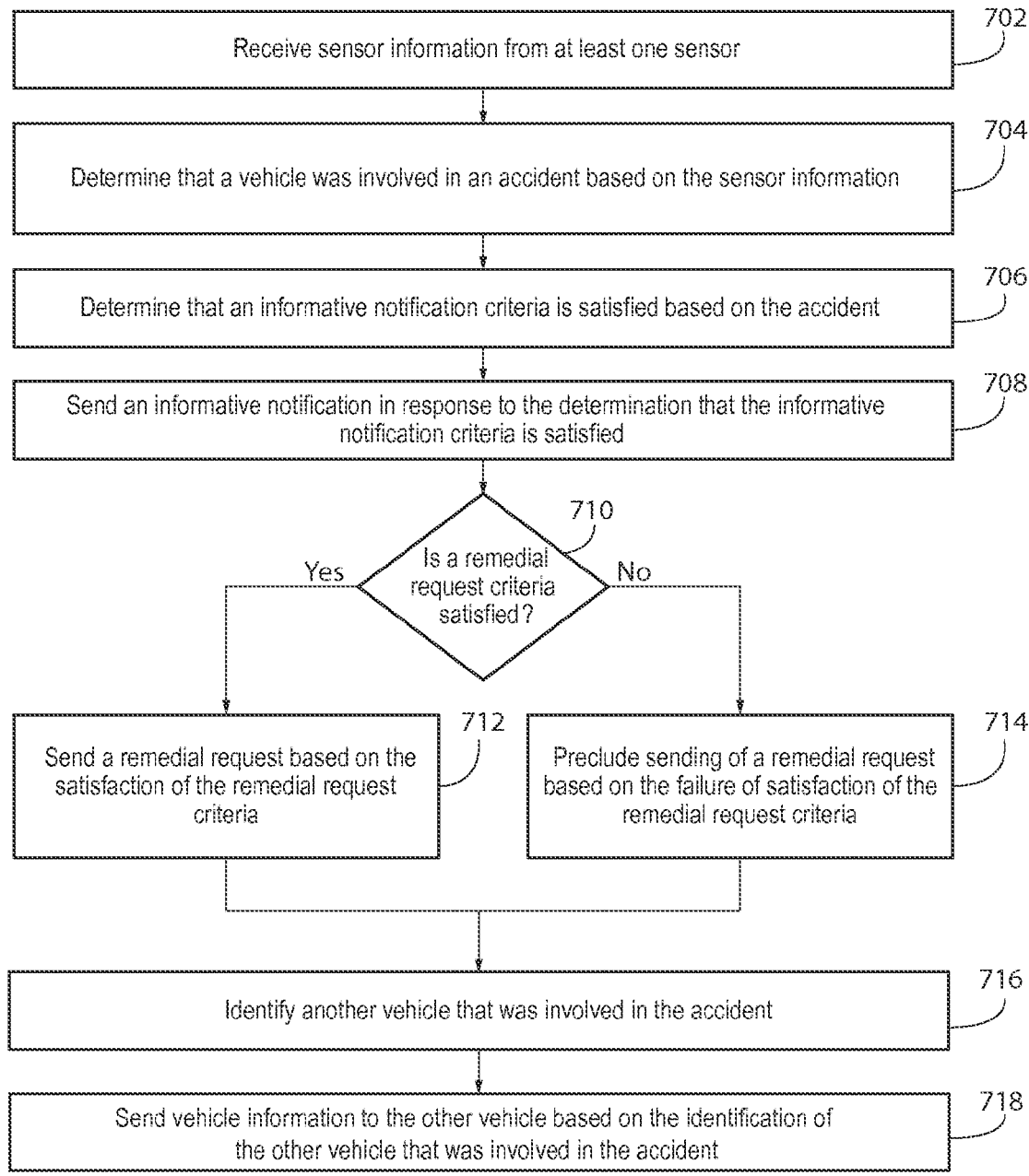
FIG. 7 is a flow diagram illustrating activities associated with sending vehicle information to another vehicle according to at least one example embodiment.

FIG. 7 is a flow diagram illustrating activities associated with sending vehicle information to another vehicle according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 7.

In some circumstances, it may be desirable to share information with another vehicle, such as another vehicle involved in the accident, with the owner of the other vehicle involved in the accident, and/or the like. For example, it may be desirable to share vehicle information with the other vehicle, such as vehicle owner information, vehicle insurance information, sensor information, and/or the like, in response to being involved in an accident with the other vehicle. For example, an apparatus may identify another vehicle that was involved in the accident, identify another vehicle that is proximate to the vehicle, and/or the like. In such an example, the apparatus may identify the other vehicle by way of communicating with other vehicles proximate to the vehicle, similar as described regarding FIG. 2. For example, two or more vehicles may broadcast that they were involved in an accident at a particular time, at a particular location, having a particular severity, and/or the like, and determine that two or more of the vehicles were involved in a single accident, in the same accident, and/or the like.

In such circumstances, it may be desirable to share sensor information with the other vehicles in order to ascertain whether any humans were involved in the accident. For example, whether the other vehicle was occupied, whether the other vehicle struck a person, and/or the like. In this manner, assistance may be requested from the proper emergency service providers even if the vehicle failed to capture sensor information that the other vehicles captured. In at least one example embodiment, an apparatus send vehicle information to the other vehicle based, at least in part, on the identification of the other vehicle. As discussed previously, the vehicle information may be vehicle insurance information, vehicle registration information, sensor information, and/or the like. For example, the apparatus may send at least a portion of the sensor information to the other vehicle based, at least in part, on the identification of the other vehicle. The portion of the sensor information may be sensor information received during a predetermined duration prior to the occurrence of the accident, a predetermined duration subsequent to the occurrence of the accident, and/or the like.

At block 702, the apparatus receives sensor information from at least one sensor. The receipt, the sensor information, and the sensor may be similar as described regarding FIG. 2 and FIG. 3.

At block 704, the apparatus determines that a vehicle was involved in an accident based, at least in part, on the sensor information. The determination, the vehicle, and the accident may be similar as described regarding FIG. 2 and FIG. 3.

At block 706, the apparatus determines that an informative notification criteria is satisfied based, at least in part, on the accident. The determination and the informative notification criteria may be similar as described regarding FIG. 3.

At block 708, the apparatus sends an informative notification in response to the determination that the informative notification criteria is satisfied. The sending and the informative notification may be similar as described regarding FIG. 2 and FIG. 3.

At block 710, the apparatus determines whether a remedial request criteria is satisfied based, at least in part, on the accident and the sensor information. If the apparatus determines that the remedial request criteria is satisfied, flow proceeds to block 612. If the apparatus determines that the remedial request criteria fails to be satisfied, flow proceeds to block 614. The determination and the remedial request criteria may be similar as described regarding FIG. 3.

At block 712, the apparatus, in circumstances where the remedial request criteria is satisfied, sends a remedial request based, at least in part, on the satisfaction of the remedial request criteria. The sending and the remedial request may be similar as described regarding FIG. 2 and FIG. 3.

At block 714, the apparatus, in circumstances where the remedial request criteria fails to be satisfied, precludes sending of the remedial request based, at least in part, on the failure of satisfaction of the remedial request criteria. The preclusion of sending the remedial request may be similar as described regarding FIG. 3.

At block 716, the apparatus identifies another vehicle that was involved in the accident. The identification of the other vehicle may be similar as described regarding FIG. 2.

At block 718, the apparatus sends vehicle information to the other vehicle based, at least in part, on the identification of the other vehicle that was involved in the accident. The sending may be similar as described regarding FIG. 2.

Figure 8:
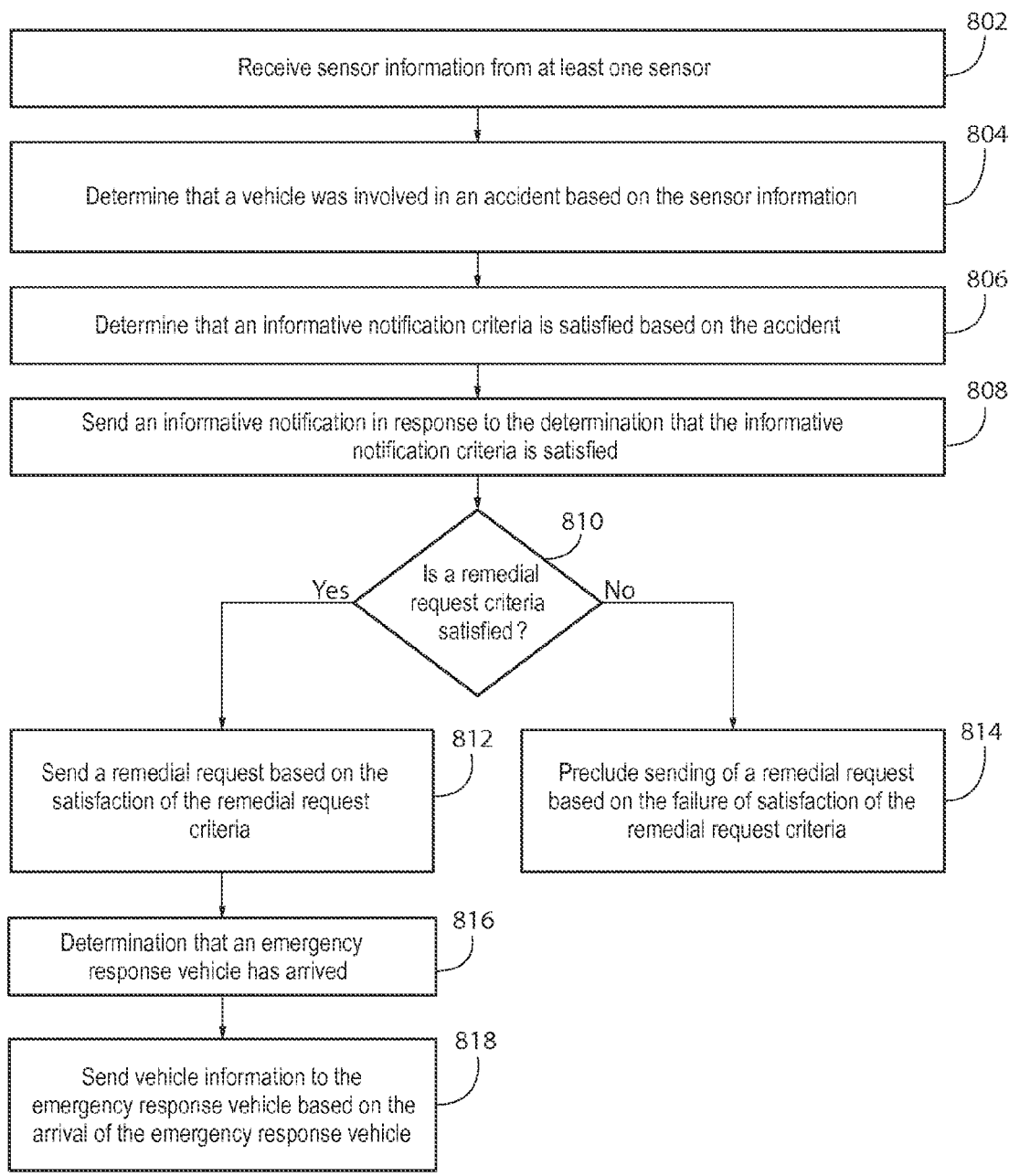
FIG. 8 is a flow diagram illustrating activities associated with determining that an emergency response vehicle has arrived according to at least one example embodiment.

FIG. 8 is a flow diagram illustrating activities associated with determining that an emergency response vehicle has arrived according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 8.

In some circumstances, it may be desirable to share information with one or more emergency service providers, emergency responders, emergency response vehicles, and/or the like. For example, it may be desirable to share vehicle information with the emergency response vehicle, such as vehicle owner information, vehicle insurance information, sensor information, and/or the like. For example, an apparatus may identify another vehicle, and determine that the other vehicle is an emergency response vehicle. In such an example, the apparatus may identify the other vehicle and/or determine that the other vehicle is an emergency response vehicle by way of communicating with other vehicles proximate to the vehicle, similar as described regarding FIG. 2. For example, the emergency response vehicle may communicate its presence to the vehicle by way of a broadcasted communication, a direct communication, a communication over a proximity-based communication channel, and/or the like. In such an example, the apparatus may send vehicle information, such as vehicle owner information, vehicle insurance information, sensor information, and/or the like, to the emergency response vehicle based, at least in part, on the determination that the other vehicle is the emergency response vehicle. In this manner, the apparatus may determine that an emergency response vehicle has arrived to the scene of the accident, and may send vehicle information to the emergency response vehicle based, at least in part, on the arrival of the emergency response vehicle.

In such circumstances, the vehicle information may be utilized by emergency response providers to facilitate performance of one or more duties tasked to the emergency response providers. For example, the vehicle information may comprise sensor information, and a police officer may review the sensor information to facilitate a determination of fault in the occurrence of the accident. Such a determination of fault may be utilized to issue traffic citations to an owner of one or more vehicles, may be communicated to one or more insurance providers in order to facilitate a determination of liability, and/or the like. For example, a ticket may be electronically issued to an owner of one of the vehicles involves in the accident, a determination of fault may be communicated to an insurance provider that covers another vehicle, and/or the like.

At block 802, the apparatus receives sensor information from at least one sensor. The receipt, the sensor information, and the sensor may be similar as described regarding FIG. 2 and FIG. 3.

At block 804, the apparatus determines that a vehicle was involved in an accident based, at least in part, on the sensor information. The determination, the vehicle, and the accident may be similar as described regarding FIG. 2 and FIG. 3.

At block 806, the apparatus determines that an informative notification criteria is satisfied based, at least in part, on the accident. The determination and the informative notification criteria may be similar as described regarding FIG. 3.

At block 808, the apparatus sends an informative notification in response to the determination that the informative notification criteria is satisfied. The sending and the informative notification may be similar as described regarding FIG. 2 and FIG. 3.

At block 810, the apparatus determines whether a remedial request criteria is satisfied based, at least in part, on the accident and the sensor information. If the apparatus determines that the remedial request criteria is satisfied, flow proceeds to block 612. If the apparatus determines that the remedial request criteria fails to be satisfied, flow proceeds to block 614. The determination and the remedial request criteria may be similar as described regarding FIG. 3.

At block 812, the apparatus, in circumstances where the remedial request criteria is satisfied, sends a remedial request based, at least in part, on the satisfaction of the remedial request criteria. The sending and the remedial request may be similar as described regarding FIG. 2 and FIG. 3.

At block 814, the apparatus, in circumstances where the remedial request criteria fails to be satisfied, precludes sending of the remedial request based, at least in part, on the failure of satisfaction of the remedial request criteria. The preclusion of sending the remedial request may be similar as described regarding FIG. 3.

At block 816, the apparatus determines that an emergency response vehicle has arrived. The determination that the emergency response vehicle has arrived may be similar as described regarding FIG. 2.

At block 818, the apparatus sends vehicle information to the emergency response vehicle based, at least in part, on the arrival of the emergency response vehicle. The sending and the vehicle information may be similar as described at least regarding FIG. 2.

One or more example embodiments may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, blocks 306 and 308 of FIG. 3 may be performed after blocks 310, 312, and 314 of FIG. 3. Furthermore, if desired, one or more of the above-described functions may be optional or may be combined. For example, block 306 of FIG. 3 may be optional and/or combined with block 304 of FIG. 3.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. An apparatus, comprising:
   at least one processor;
   at least one memory including computer program code, the memory and the computer program code configured to, working with the processor, cause the apparatus to:
   receive sensor information from at least one sensor;
   determine that a vehicle was involved in an accident based, at least in part, on the sensor information;
   determine that an informative notification criteria is satisfied based, at least in part, on the accident;
   send an informative notification in response to the determination that the informative notification criteria is satisfied;
   determine whether a remedial request criteria is satisfied based, at least in part, on the accident and the sensor information;
   in circumstances where the remedial request criteria is satisfied, send a remedial request based, at least in part, on the satisfaction of the remedial request criteria;
   in circumstances where the remedial request criteria fails to be satisfied, preclude sending of the remedial request based, at least in part, on the failure of satisfaction of the remedial request criteria;
   determine a location of the vehicle;
   determine that the vehicle is located at a dangerous location based, at least in part, on the location of the vehicle;
   determine a navigational path to another location that fails to be a dangerous location; and
   cause the vehicle to move along the navigational path to the other location.

2. The apparatus of claim 1, wherein the memory includes computer program code configured to, working with the processor, cause the apparatus to determine that the vehicle fails to be occupied, wherein the determination of whether the remedial request criteria is satisfied is based, at least in part, on the determination that the vehicle fails to be occupied.

3. The apparatus of claim 1, wherein the remedial request criteria is an emergency assistance request criteria, and the remedial request is an emergency assistance request.

4. The apparatus of claim 1, wherein the remedial request criteria is a site remedy assistance criteria, and the remedial request is a site remedy assistance request.

5. The apparatus of claim 1, wherein the informative notification is an owner informative notification.

6. The apparatus of claim 1, wherein the memory includes computer program code configured to, working with the processor, cause the apparatus to:
   identify another vehicle that was involved in the accident; and
   send vehicle information to the other vehicle based, at least in part, on the identification of the other vehicle.

7. The apparatus of claim 1, wherein the memory includes computer program code configured to, working with the processor, cause the apparatus to:
   determine that an emergency response vehicle has arrived; and
   send vehicle information to the emergency response vehicle based, at least in part, on the arrival of the emergency response vehicle.

8. The apparatus of claim 1, wherein the apparatus comprises the sensor.

9. A method comprising:
   receiving sensor information from at least one sensor;
   determining that a vehicle was involved in an accident based, at least in part, on the sensor information;
   determining that an informative notification criteria is satisfied based, at least in part, on the accident;
   sending an informative notification in response to the determination that the informative notification criteria is satisfied;
   determining whether a remedial request criteria is satisfied based, at least in part, on the accident and the sensor information;
   in circumstances where the remedial request criteria is satisfied, sending a remedial request based, at least in part, on the satisfaction of the remedial request criteria;
   in circumstances where the remedial request criteria fails to be satisfied, precluding sending of the remedial request based, at least in part, on the failure of satisfaction of the remedial request criteria;
   determining a location of the vehicle;

determining that the vehicle is located at a dangerous location based, at least in part, on the location of the vehicle; and determining a navigational path to another location that fails to be a dangerous location.

10. The method of claim 9, wherein the remedial request criteria is an emergency assistance request criteria, and the remedial request is an emergency assistance request.

11. The method of claim 9, wherein the remedial request criteria is a site remedy assistance criteria, and the remedial request is a site remedy assistance request.

12. The method of claim 9, wherein the informative notification is an owner informative notification.

13. The method of claim 9, further comprising:
causing the vehicle to move along the navigational path to the other location.

14. The method of claim 9, further comprising:
identifying another vehicle that was involved in the accident; and
sending vehicle information to the other vehicle based, at least in part, on the identification of the other vehicle.

15. The method of claim 9, further comprising:
determining that an emergency response vehicle has arrived; and
sending vehicle information to the emergency response vehicle based, at least in part, on the arrival of the emergency response vehicle.

16. At least one non-transitory computer-readable medium encoded with instructions that, when executed by a processor:
receive sensor information from at least one sensor;
determine that a vehicle was involved in an accident based, at least in part, on the sensor information;
determine that an informative notification criteria is satisfied based, at least in part, on the accident;
send an informative notification in response to the determination that the informative notification criteria is satisfied;
determine whether a remedial request criteria is satisfied based, at least in part, on the accident and the sensor information;
in circumstances where the remedial request criteria is satisfied, send a remedial request based, at least in part, on the satisfaction of the remedial request criteria;
in circumstances where the remedial request criteria fails to be satisfied, preclude sending of the remedial request based, at least in part, on the failure of satisfaction of the remedial request criteria;
determine a location of the vehicle;
determine that the vehicle is located at a type of location based, at least in part, on the location of the vehicle;
determine a navigational path to another location; and
cause the vehicle to move along the navigational path to the other location.

17. The medium of claim 16, further encoded with instructions that, when executed by a processor:
identify another vehicle that was involved in the accident; and
send vehicle information to the other vehicle based, at least in part, on the identification of the other vehicle.

18. The medium of claim 16, further encoded with instructions that, when executed by a processor:
determine that an emergency response vehicle has arrived; and
send vehicle information to the emergency response vehicle based, at least in part, on the arrival of the emergency response vehicle.

19. The medium of claim 16, wherein the type of location is a dangerous location, and wherein the other location fails to be a dangerous location.

20. An apparatus, comprising:
at least one processor;
at least one memory including computer program code, the memory and the computer program code configured to, working with the processor, cause the apparatus to:
receive sensor information from at least one sensor;
determine that a vehicle was involved in an accident based, at least in part, on the sensor information;
determine that an informative notification criteria is satisfied based, at least in part, on the accident;
send an informative notification in response to the determination that the informative notification criteria is satisfied;
determine whether a remedial request criteria is satisfied based, at least in part, on the accident and the sensor information;
in circumstances where the remedial request criteria is satisfied, send a remedial request based, at least in part, on the satisfaction of the remedial request criteria;
in circumstances where the remedial request criteria fails to be satisfied, preclude sending of the remedial request based, at least in part, on the failure of satisfaction of the remedial request criteria;
determine a location of the vehicle;
determine that the vehicle is located at a dangerous location based, at least in part, on the location of the vehicle; and
determine a navigational path to another location that fails to be a dangerous location.

21. A method comprising:
receiving sensor information from at least one sensor;
determining that a vehicle was involved in an accident based, at least in part, on the sensor information;
determining that an informative notification criteria is satisfied based, at least in part, on the accident;
sending an informative notification in response to the determination that the informative notification criteria is satisfied;
determining whether a remedial request criteria is satisfied based, at least in part, on the accident and the sensor information;
in circumstances where the remedial request criteria is satisfied, sending a remedial request based, at least in part, on the satisfaction of the remedial request criteria;
in circumstances where the remedial request criteria fails to be satisfied, precluding sending of the remedial request based, at least in part, on the failure of satisfaction of the remedial request criteria;
determining a location of the vehicle;
determining that the vehicle is located at a type of location based, at least in part, on the location of the vehicle;
determining a navigational path to another location; and
causing the vehicle to move along the navigational path to the other location.

* * * * *